(12) United States Patent
Greifeneder et al.

(10) Patent No.: US 10,664,837 B2
(45) Date of Patent: May 26, 2020

(54) METHOD AND SYSTEM FOR REAL-TIME, LOAD-DRIVEN MULTIDIMENSIONAL AND HIERARCHICAL CLASSIFICATION OF MONITORED TRANSACTION EXECUTIONS FOR VISUALIZATION AND ANALYSIS TASKS LIKE STATISTICAL ANOMALY DETECTION

(71) Applicant: Dynatrace LLC, Waltham, MA (US)

(72) Inventors: Bernd Greifeneder, Linz (AT); Otmar Ertl, Linz (AT); Herwig Moser, Freistadt (AT); Ernst Ambichl, Altenberg (AT); Helmut Spiegl, Linz (AT)

( * ) Notice: Subject to any disclaimer, the term of this patent is extended or adjusted under 35 U.S.C. 154(b) by 393 days.

(21) Appl. No.: 15/227,029

(22) Filed: Aug. 3, 2016

(65) Prior Publication Data
US 2017/0039554 A1 Feb. 9, 2017

Related U.S. Application Data

(60) Provisional application No. 62/200,875, filed on Aug. 4, 2015, provisional application No. 62/335,725, filed on May 13, 2016.

(51) Int. Cl.
*G06F 11/07* (2006.01)
*G06F 11/34* (2006.01)
*G06Q 20/38* (2012.01)
*G06Q 20/10* (2012.01)
*G06Q 20/40* (2012.01)

(52) U.S. Cl.
CPC ......... *G06Q 20/389* (2013.01); *G06Q 20/102* (2013.01); *G06Q 20/40* (2013.01)

(58) Field of Classification Search
CPC .......... G06F 17/30598; G06F 11/0709; G06F 11/0766; G06F 11/3409; G06F 11/3452; H04L 41/142; H04L 43/04; G06Q 10/0635
See application file for complete search history.

(56) References Cited

U.S. PATENT DOCUMENTS

| | | | |
|---|---|---|---|
| 8,938,533 B1 * | 1/2015 | Bansal | H04L 43/022 709/224 |
| 2015/0032752 A1 * | 1/2015 | Greifeneder | G06F 17/30598 707/738 |

* cited by examiner

*Primary Examiner* — Hao Fu
(74) *Attorney, Agent, or Firm* — Harness, Dickey & Pierce, P.L.C.

(57) ABSTRACT

A system and method is disclosed that analyzes a set of historic transaction traces to identify an optimized set of transaction clusters with the highest transaction frequency. The transaction clusters are defined according to multiple parameters describing the execution context of the analyzed transactions. The transaction clusters are described by coordinates in a multidimensional, hierarchical classification space. Descriptive statistical data is extracted from historic transactions corresponding to previously identified transaction clusters and stored as reference data. Transaction trace data from currently executed transactions is analyzed to find a best matching historic transaction cluster. The current transaction traces are grouped according to their corresponding historic transaction cluster. Statistical data is extracted from those groups of current transaction trace and statistical test are performed that compare current and historic data on a per historic transaction cluster basis to identify deviations in performance and functional behavior of current and historic transactions.

35 Claims, 24 Drawing Sheets

Overview

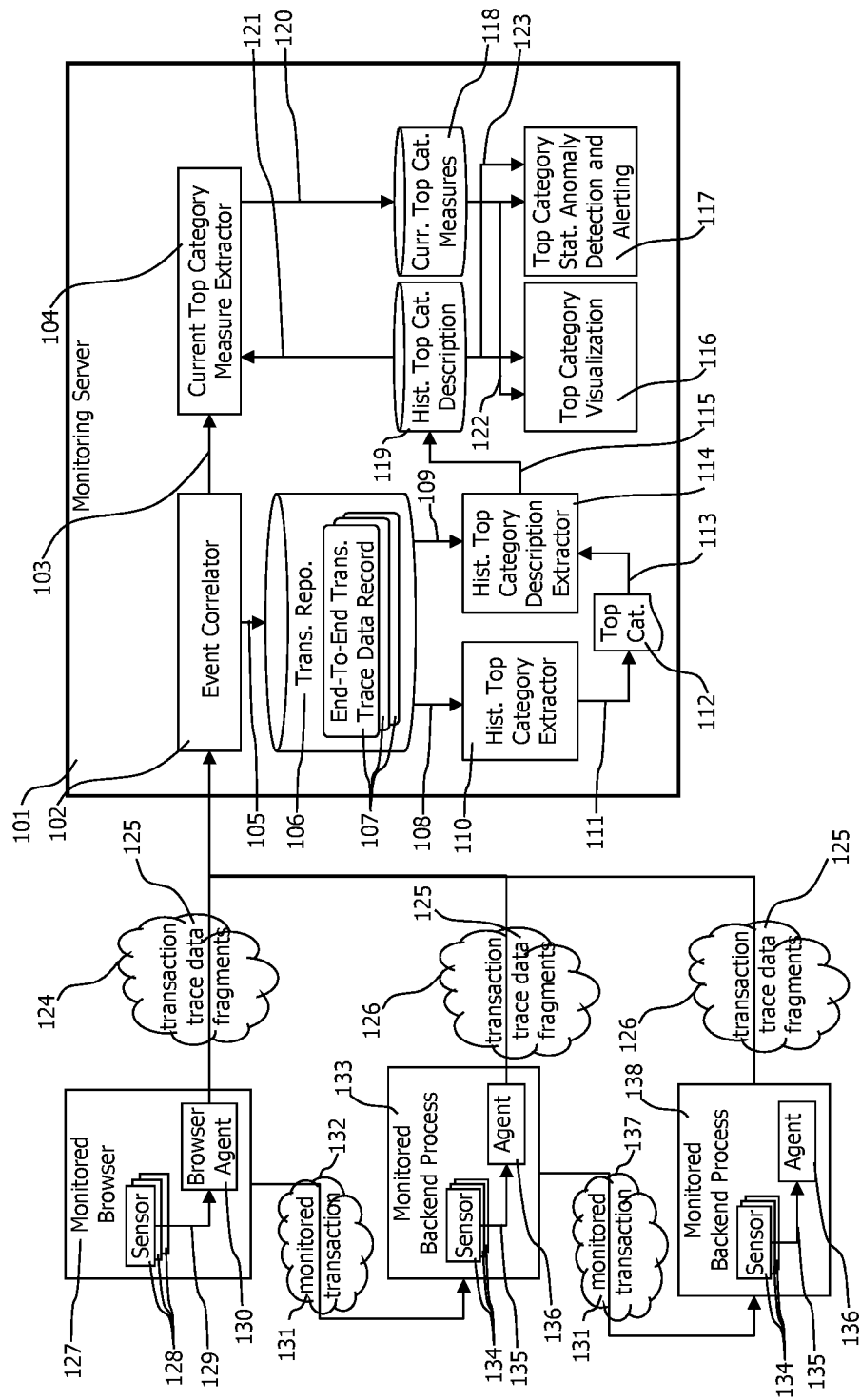
FIG 1: Overview

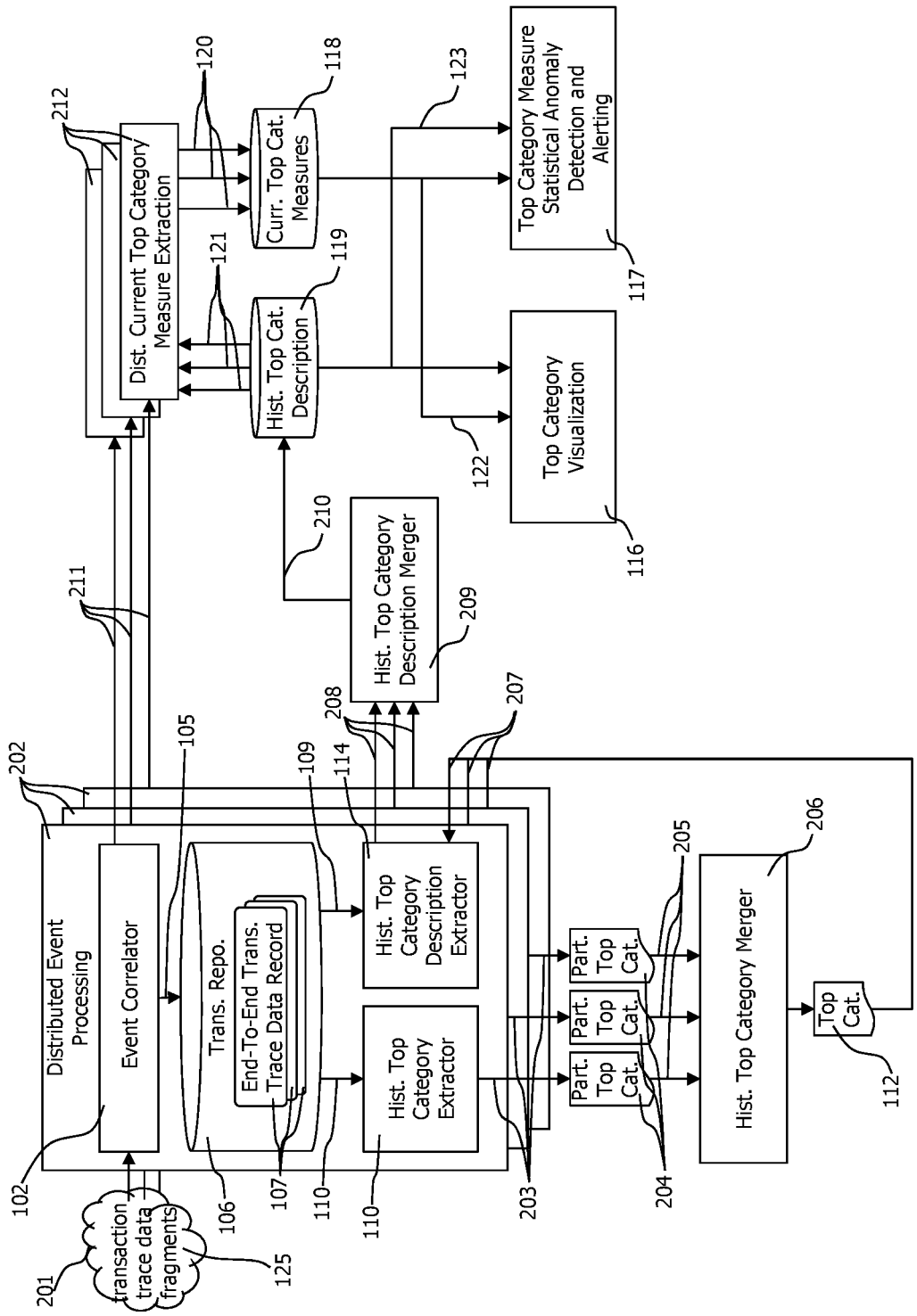

FIG 3: End-To-End Transaction Trace Data Record, Top Category List Structure
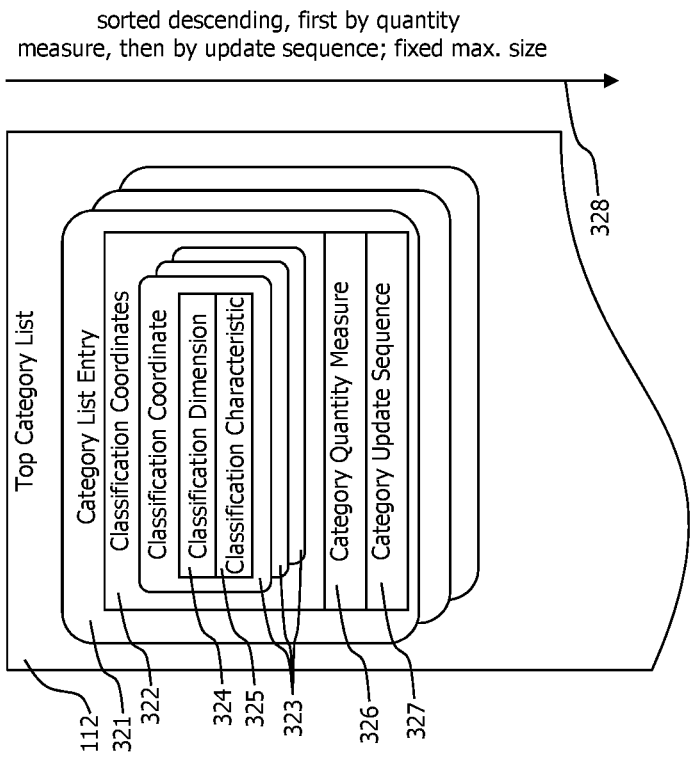
FIG 3b: Top Category List
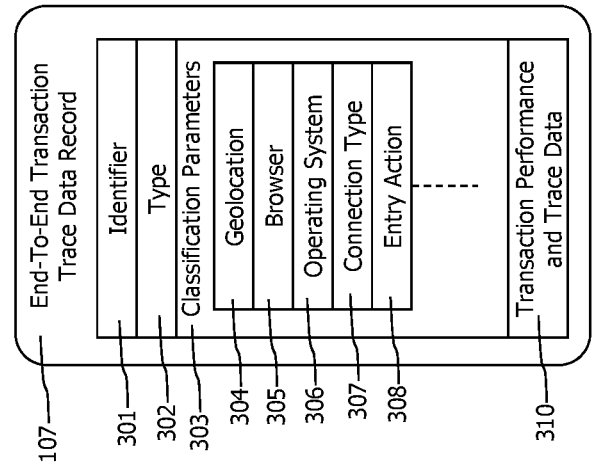
FIG 3a: End-to-End Transaction Trace Data Record

FIG 4: Exemplary Transaction Classification Hierarchy Dimensions
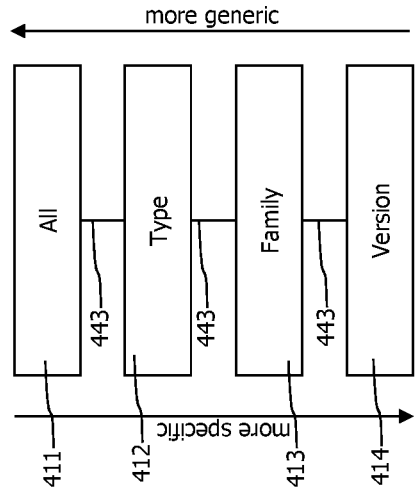
FIG 4b: Browser
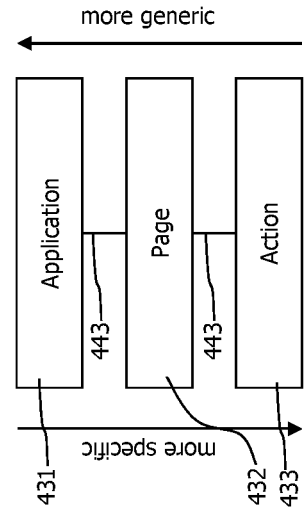
FIG 4d: Action
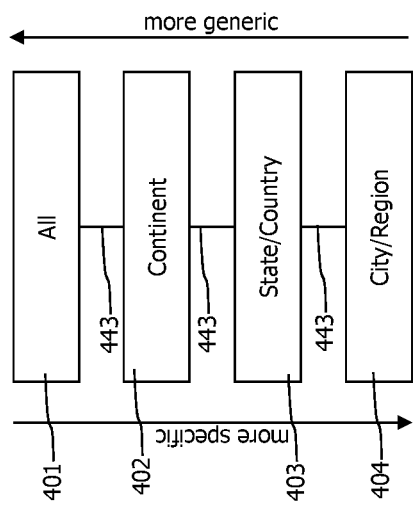
FIG 4a: Geolocation
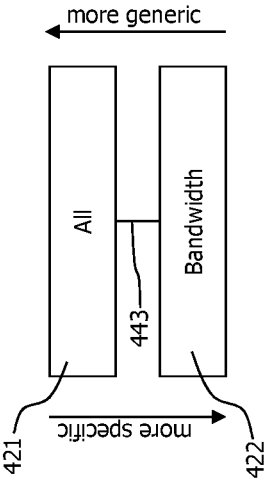
FIG 4c: Connection Type

FIG 5: Exemplary Transaction Classification Hierarchy Dimension Characteristics
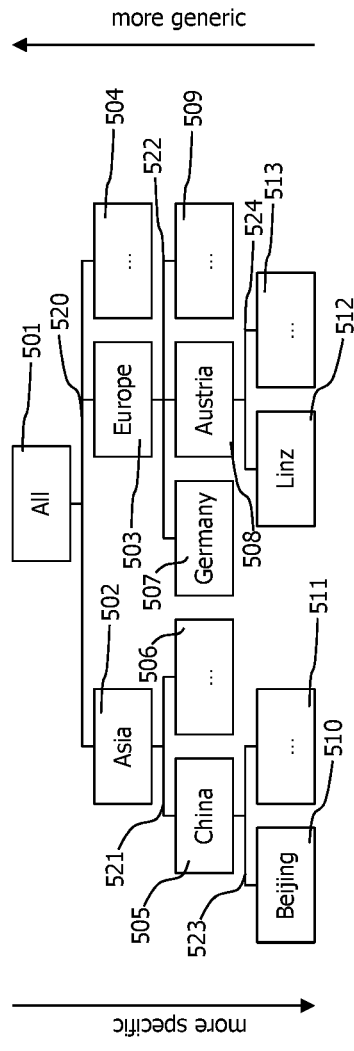
FIG 5a: Geolocation Characteristics
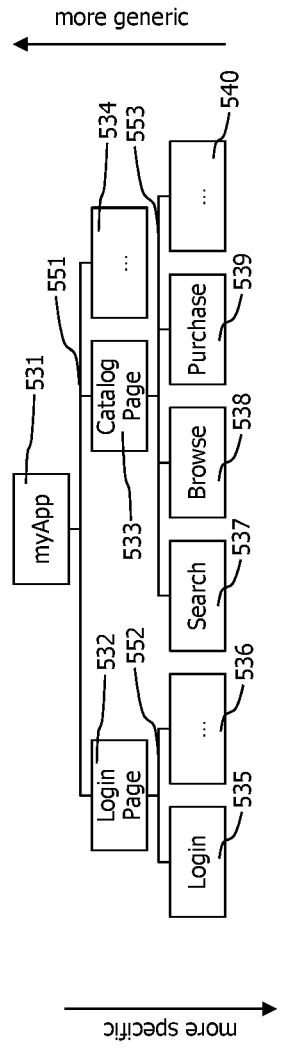
FIG 5b: Action Characteristics

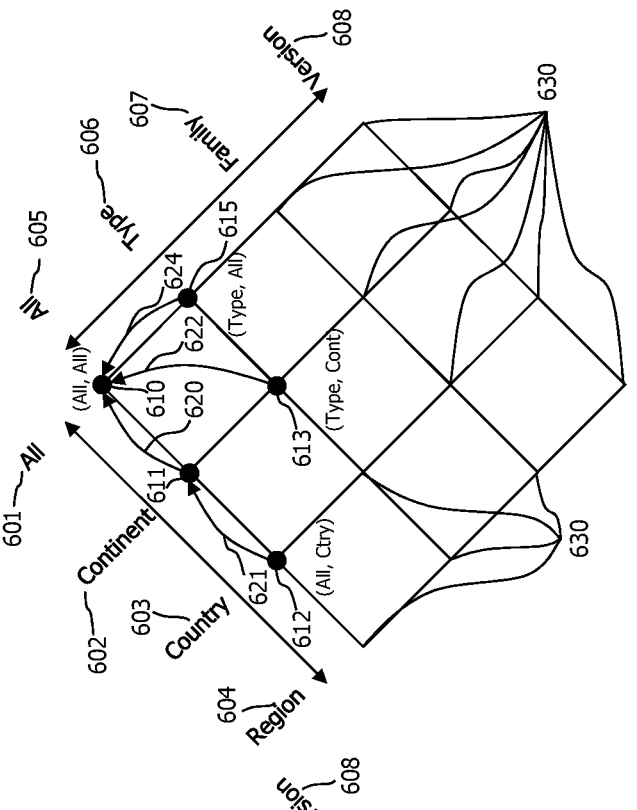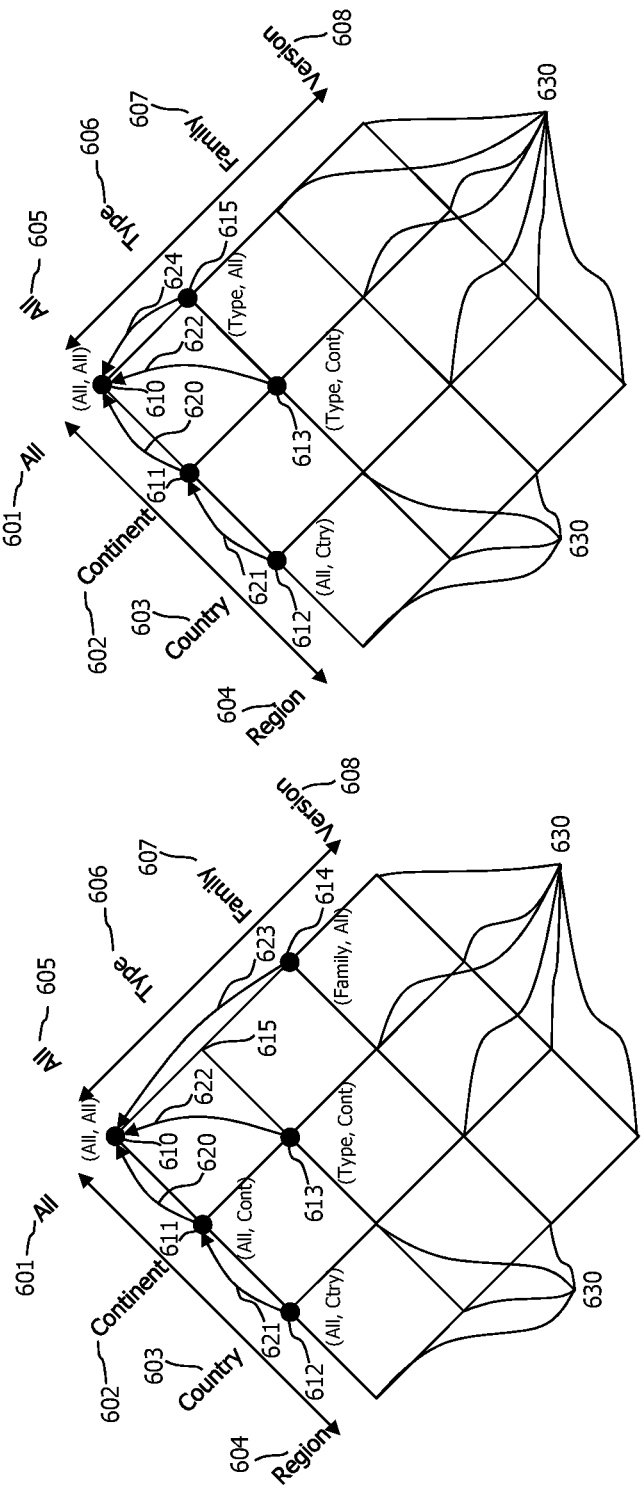
FIG 6: Complete vs. Fragmented Multidimensional Hierarchy

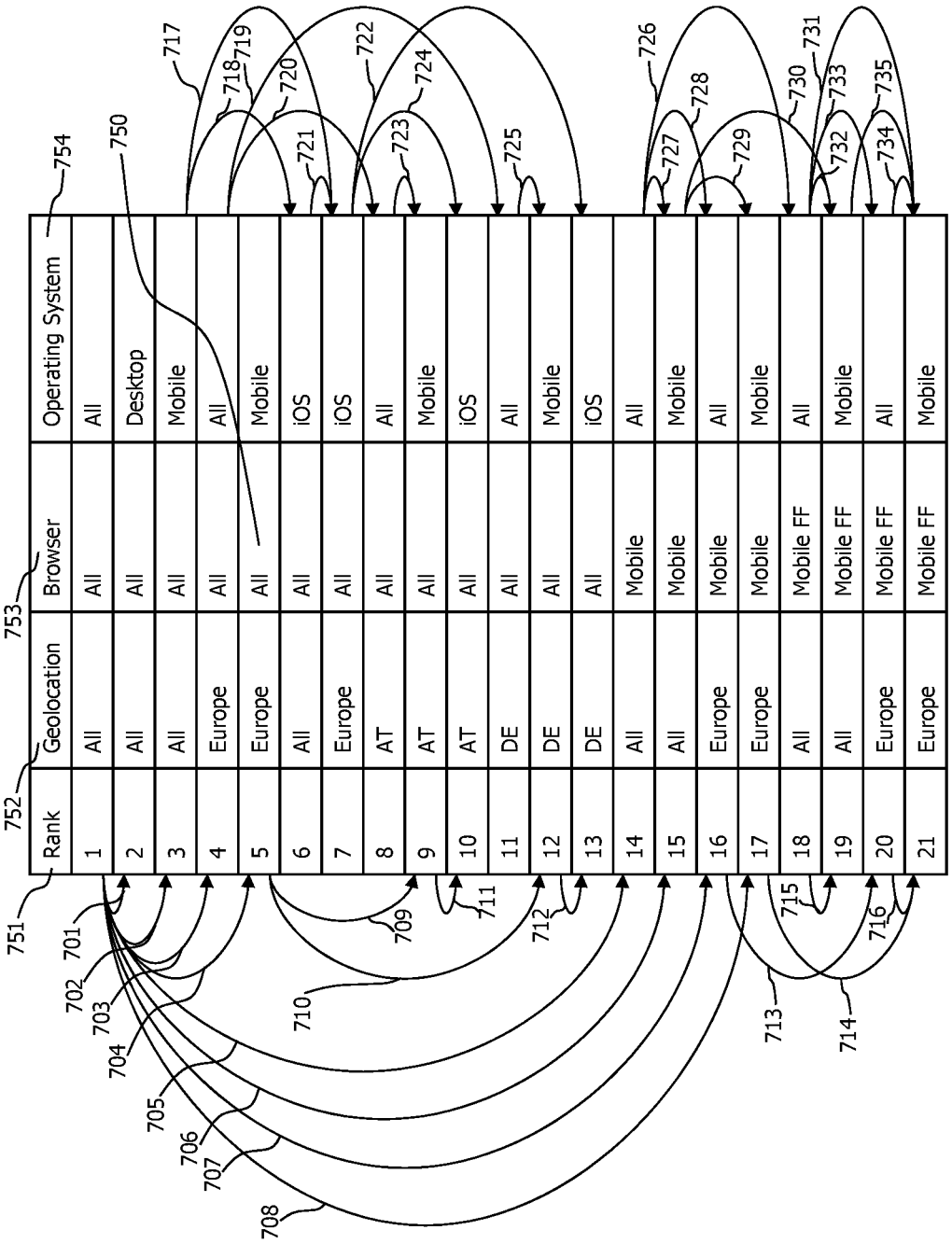
FIG 7: Exemplary Not Fragmented Top Category List Sorted According Parents before Children Sort Criteria

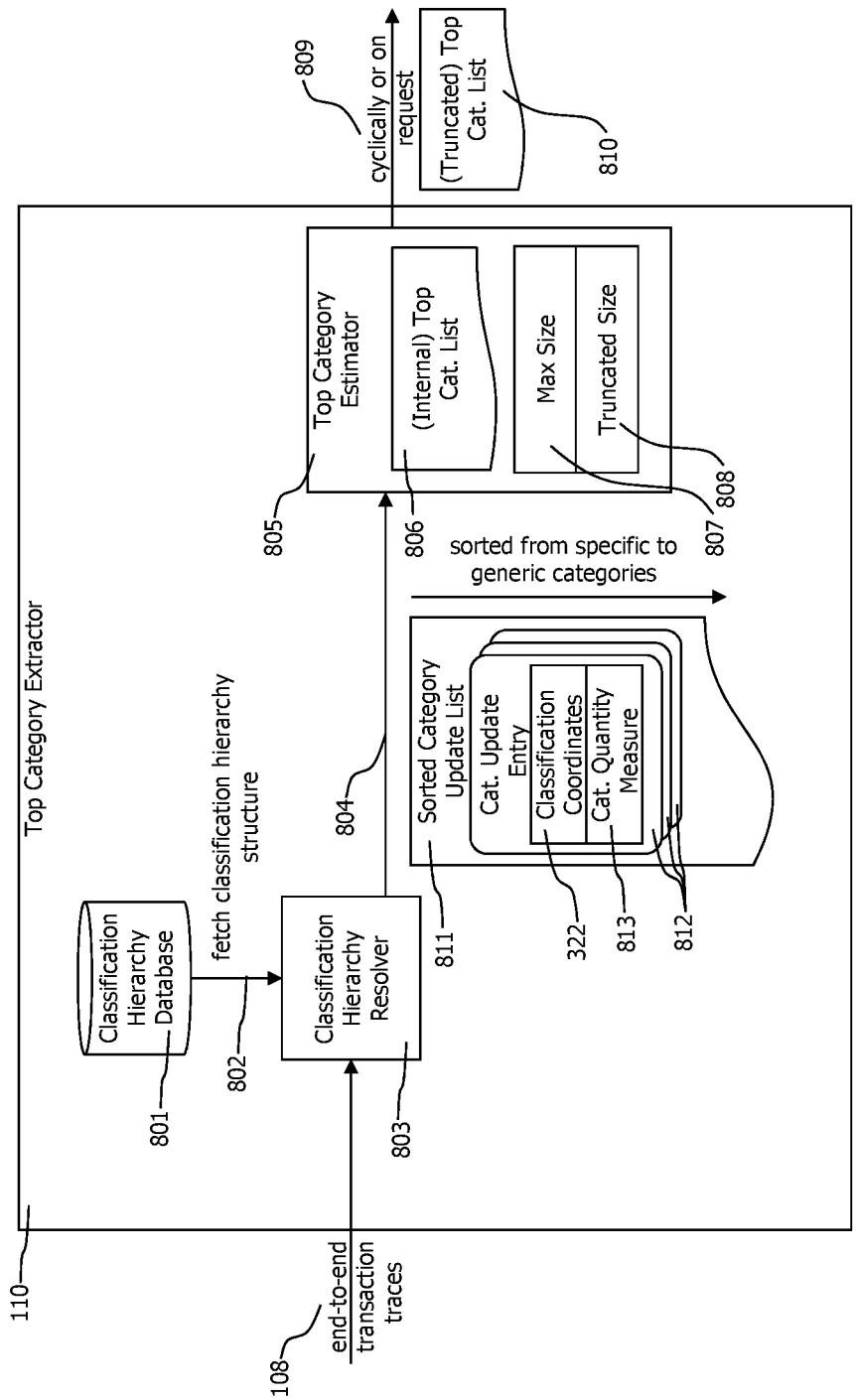
FIG 8: Historic Top Category Extractor

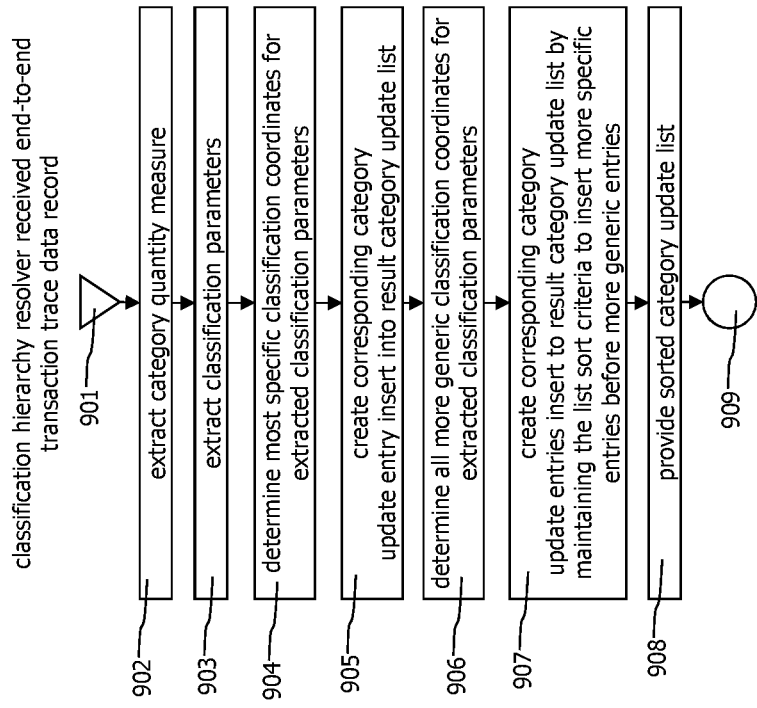
FIG 9: Calculation of Sorted Category Update List

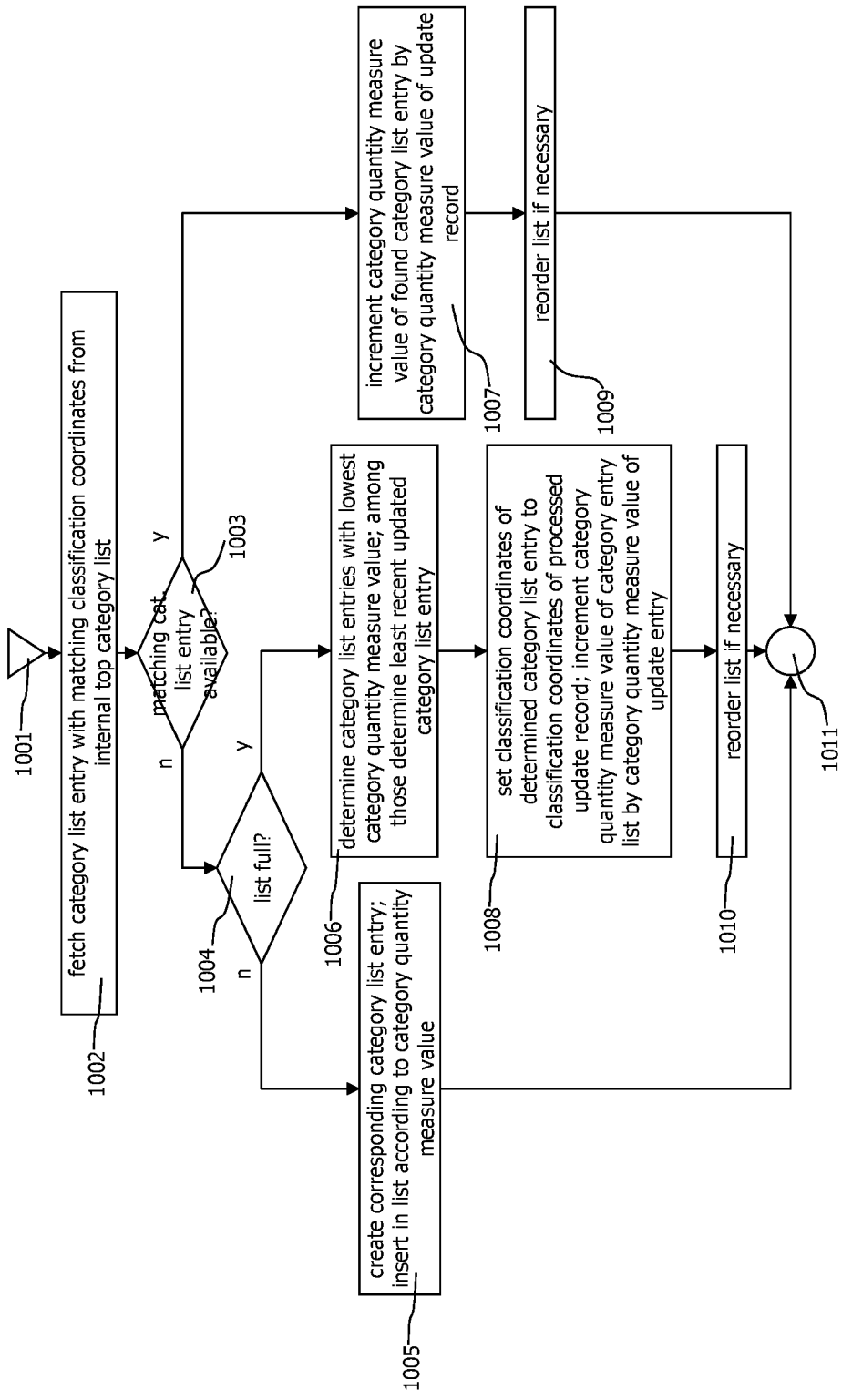

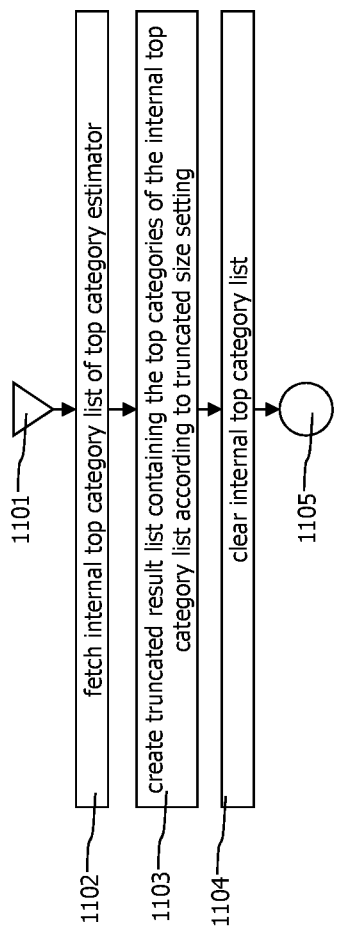
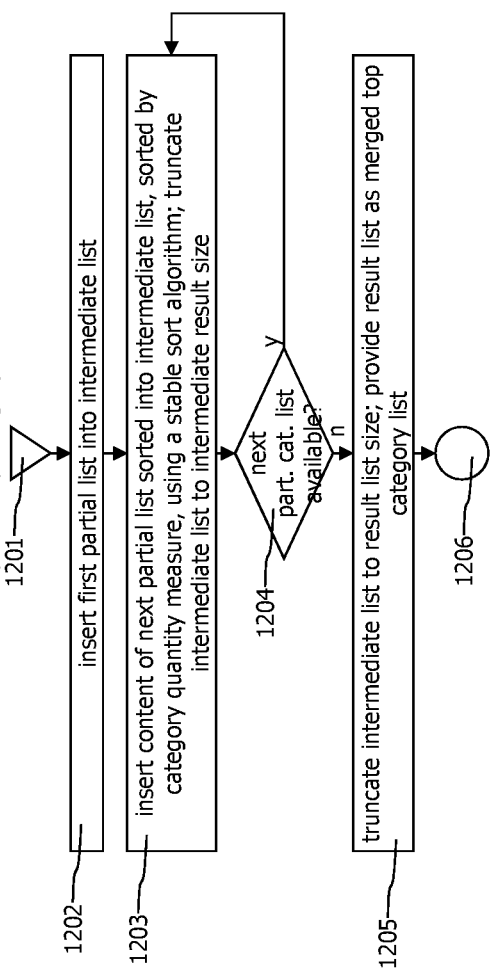

FIG 13: Historic Top Category Description and Current Top Category Measure Record

FIG 13a: Historic Top Category Description Record

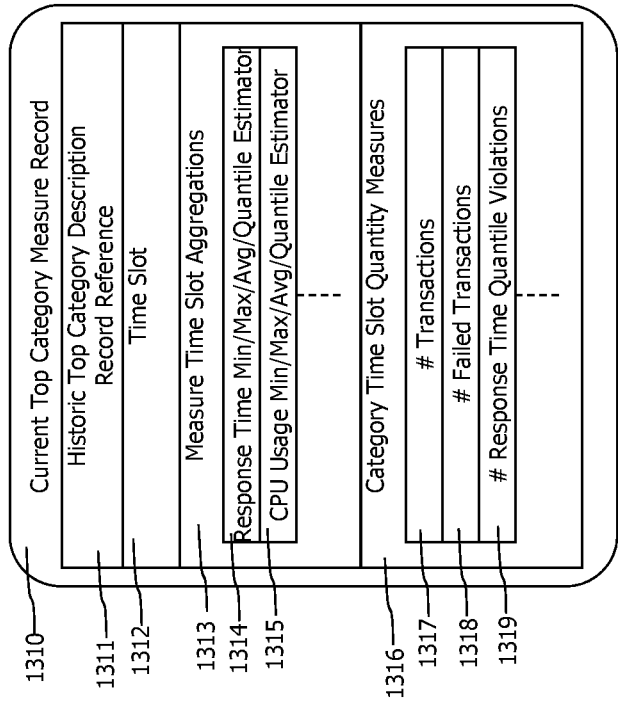

- 1301 — Historic Top Category Description Record
- 322 — Classification Coordinates
- 1302 — Time Series List
- 1303 — Response Time TS
- 1304 — CPU Usage TS
- 1305 — Load TS
- 1306 — Descriptive Statistical Parameters
- 1307 — Respons Time Quantiles
- 1308 — Error Rates

FIG 13b: Current Top Category Measure Record

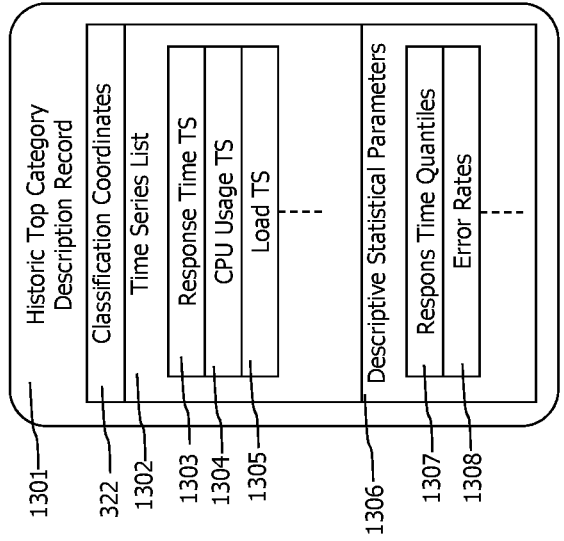

- 1310 — Current Top Category Measure Record
- 1311 — Historic Top Category Description Record Reference
- 1312 — Time Slot
- 1313 — Measure Time Slot Aggregations
- 1314 — Response Time Min/Max/Avg/Quantile Estimator
- 1315 — CPU Usage Min/Max/Avg/Quantile Estimator
- 1316 — Category Time Slot Quantity Measures
- 1317 — # Transactions
- 1318 — # Failed Transactions
- 1319 — # Response Time Quantile Violations

FIG 14: Identification of Matching Top Categories for Exemplary Transaction
FIG 14a: Portion of Surrounding Hierarchical Category Space For Incoming Transaction
FIG 14b: Relevant Slice of Hierarchical Category Space For Incoming Transaction
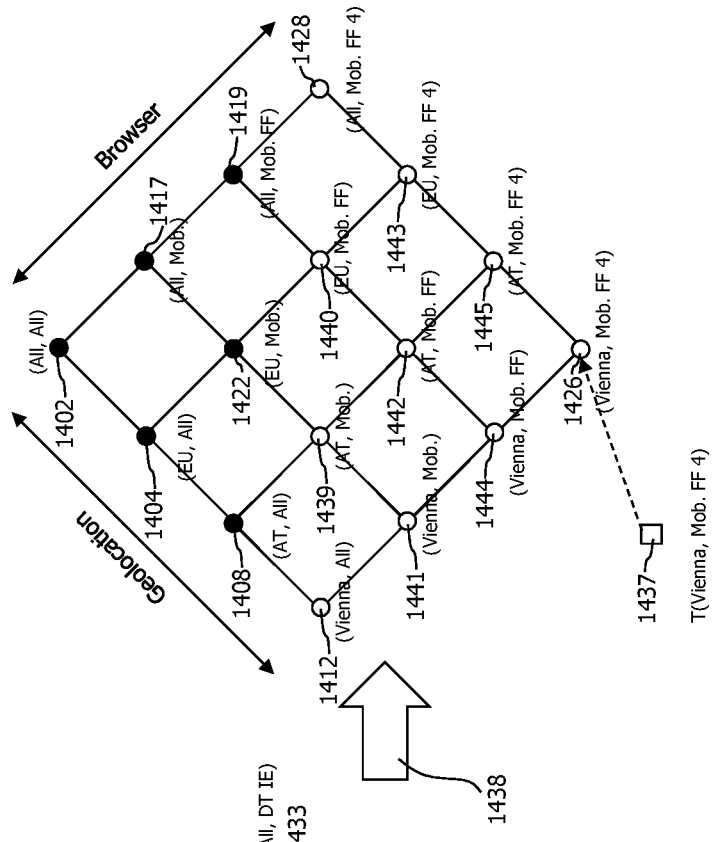
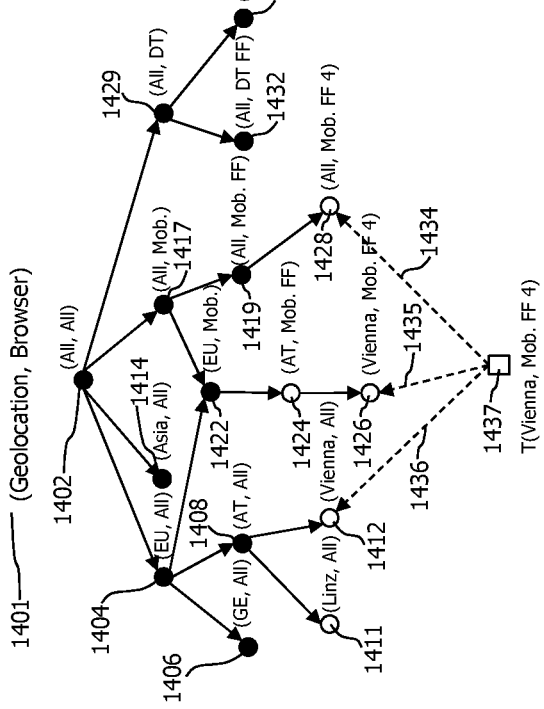

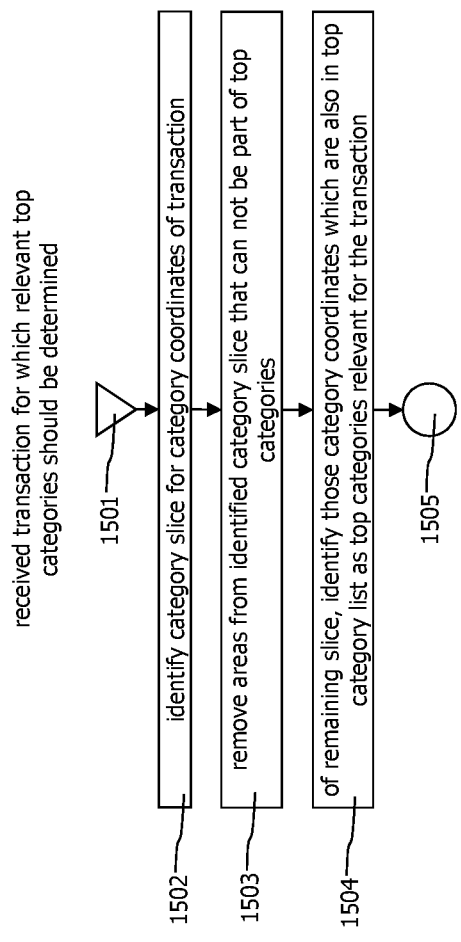
FIG 15: Process of Determining Relevant Top Categories For Incoming Transactions

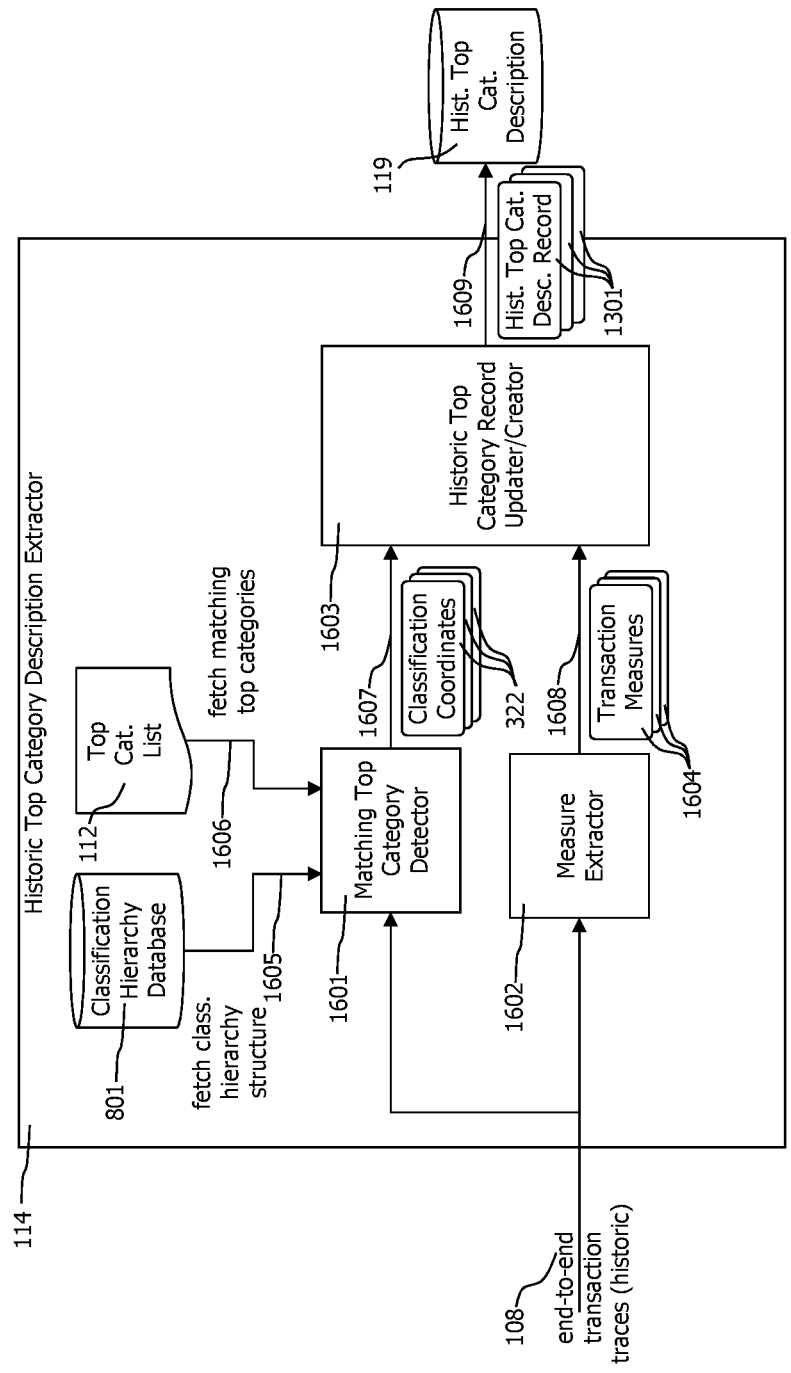
FIG 16: Historic Top Category Description Extractor

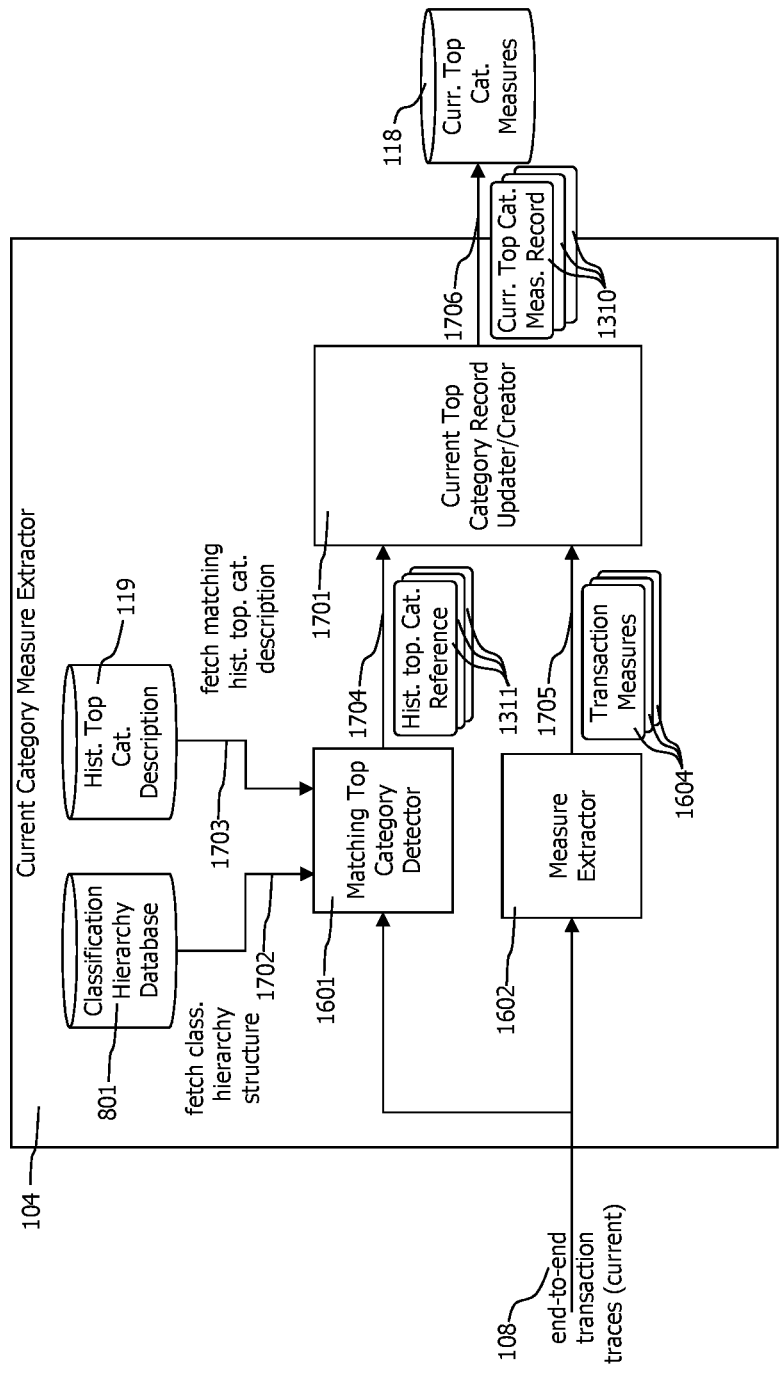
FIG 17: Current Top Category Measure Extractor

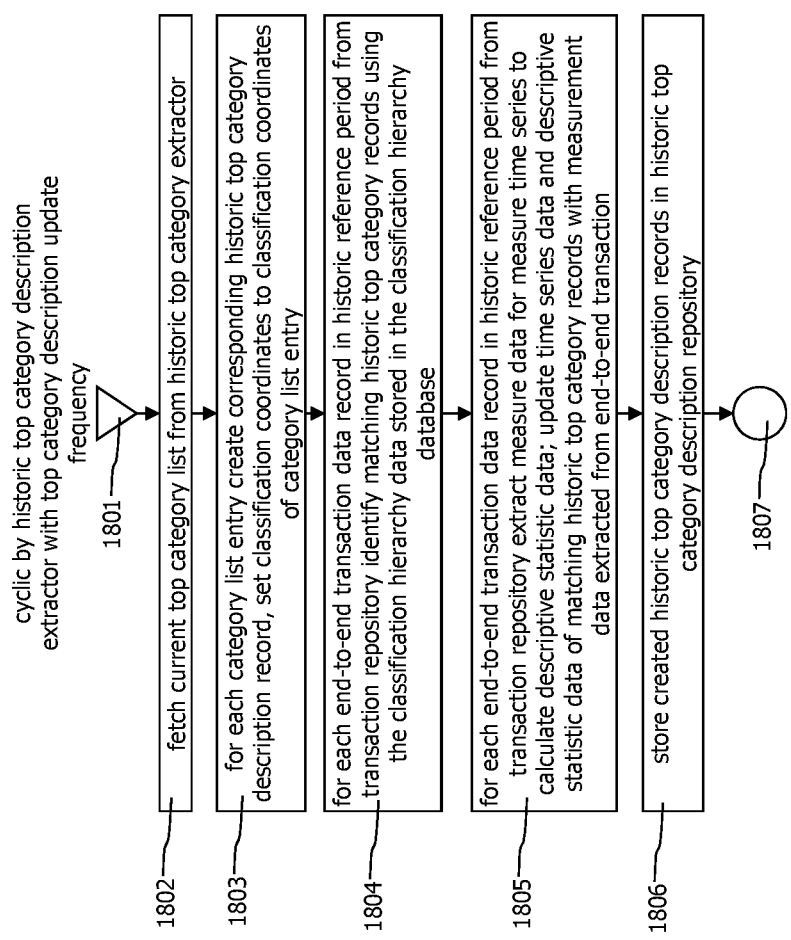
FIG 18: Cyclic Top Category Description Update

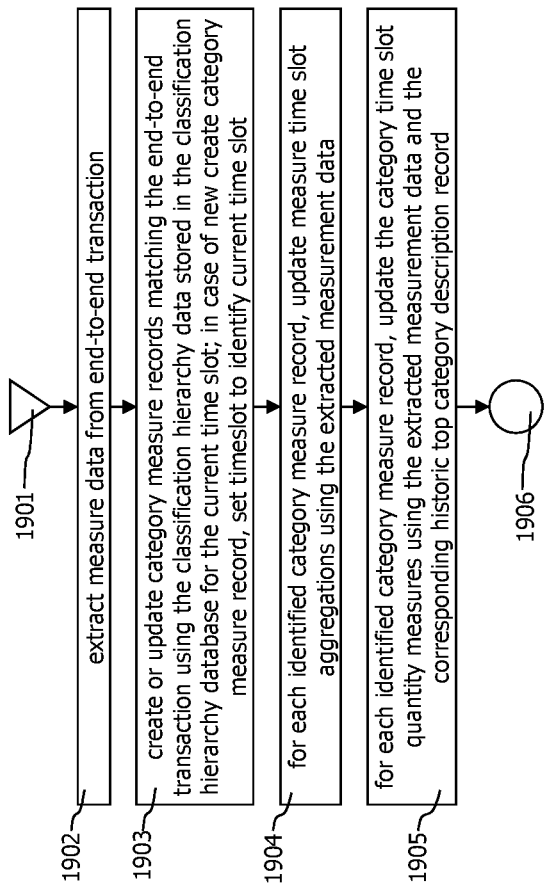

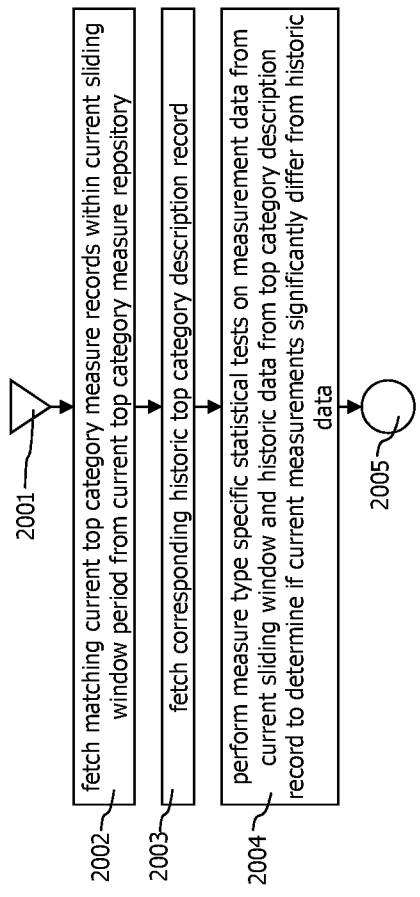
FIG 20: Cyclic Top Category Based Statistical Anomaly Detection

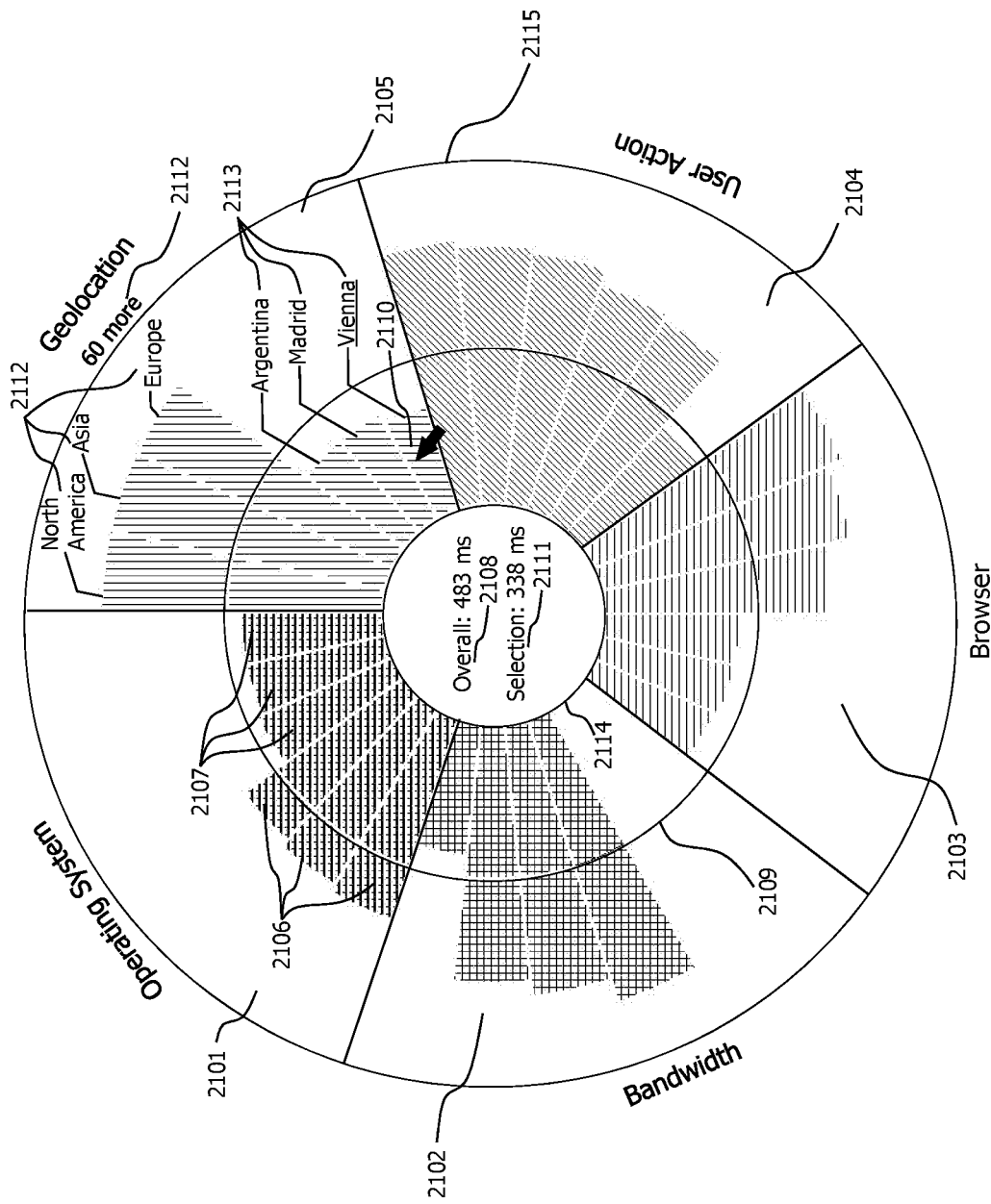
FIG 21: Exemplary Visualization of Response Time Per Dimensional Top Categories

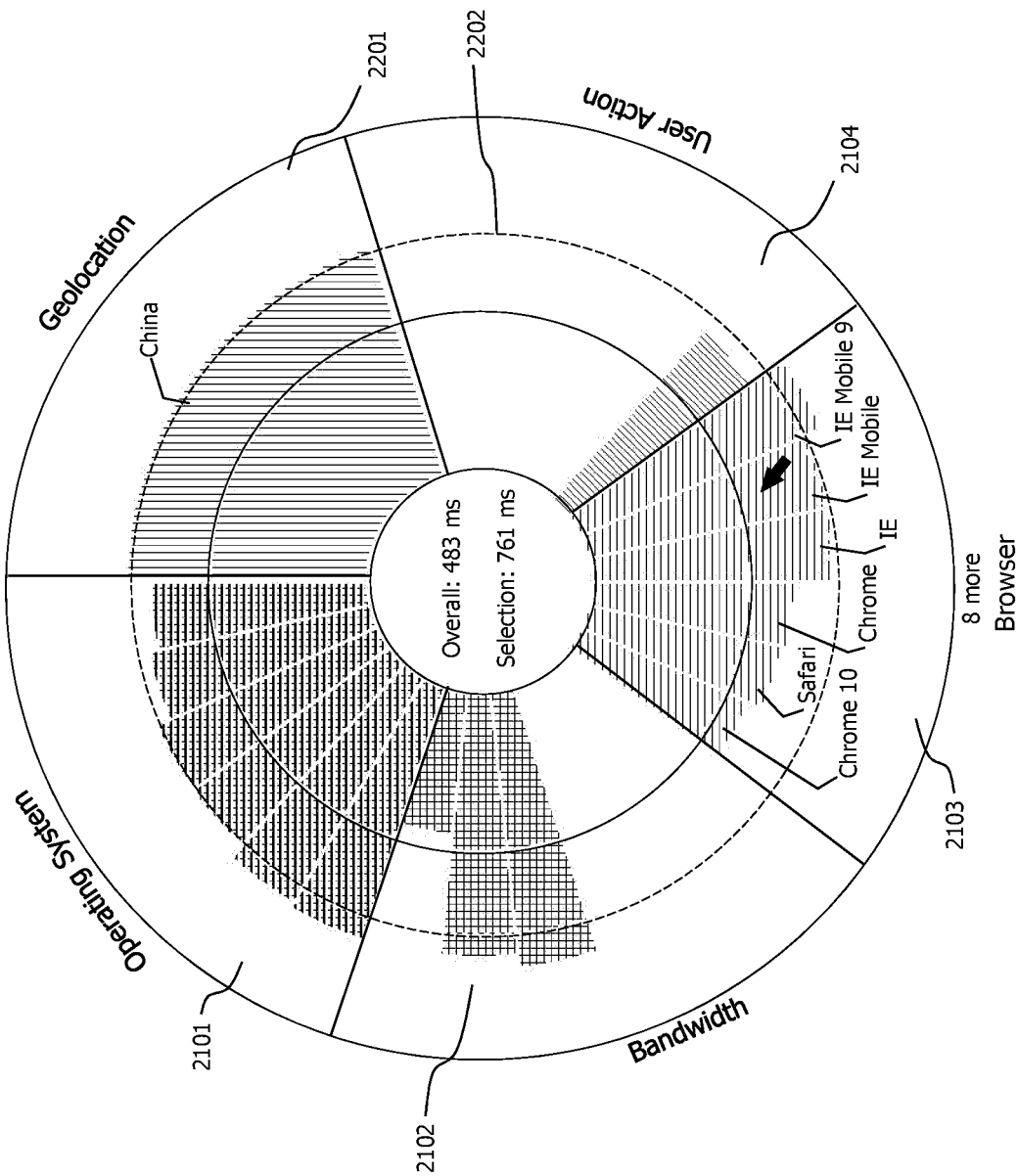
FIG 22: Visualization Drilldown by Fixing one Dimension

FIG 23: Identifying Anomaly Candidate Edges

FIG 23a: Edge Record

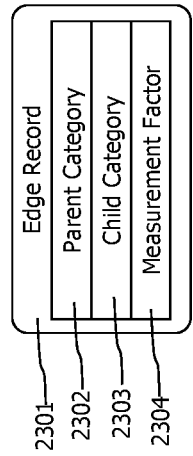

- 2301 — Edge Record
- 2302 — Parent Category
- 2303 — Child Category
- 2304 — Measurement Factor

FIG 23b: Create Set of Edge Records with highest Parent/Child Deviation

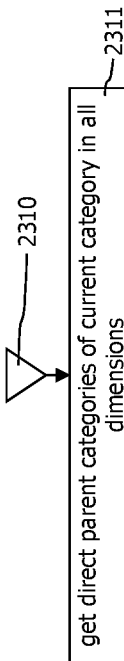

- 2310 — top category set with measurements per category received, for each top category
- 2311 — get direct parent categories of current category in all dimensions
- 2312 — calculate measurement factor as child measurement value/parent measurement value
- 2313 — identify parent category with measurement factor indicating highest deviation to measure value of current category
- 2314 — create edge record; set parent category to identified parent category; set child category to current category, set measurement factor to measurement factor calculated for identified parent category; add created edge record to result set
- 2315

FIG 23c: Exemplary Top Category Set

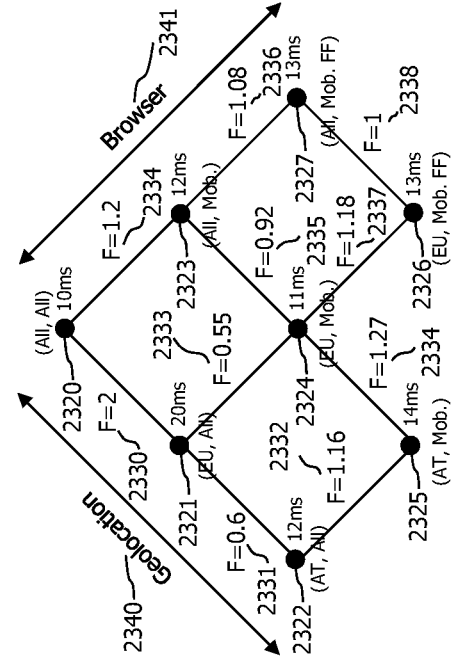

FIG 23d: Ranking Anomaly Candidate Edges

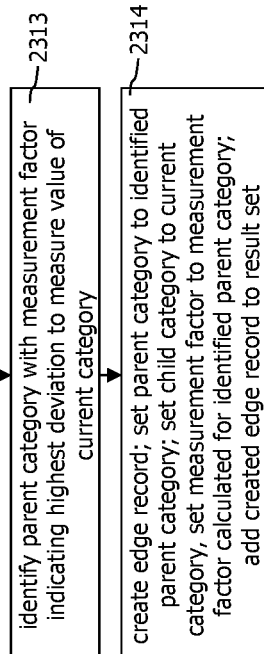

- 2351 — anomaly candidate edge set received
- 2352 — sort anomaly nodes descending according to measurement value deviation indicated by measurement factor
- 2353

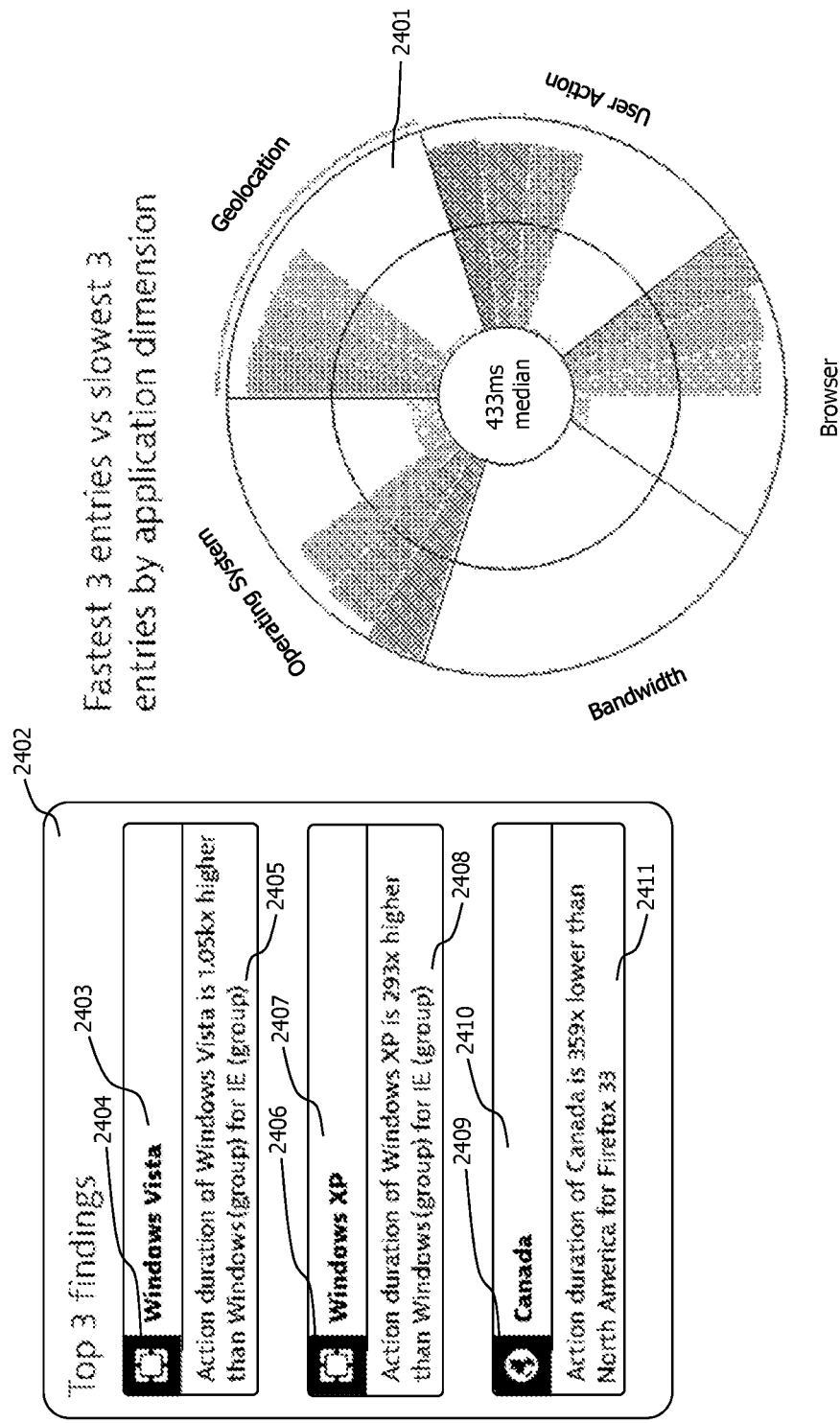
FIG 24: Exemplary Visualization of identified Anomalies

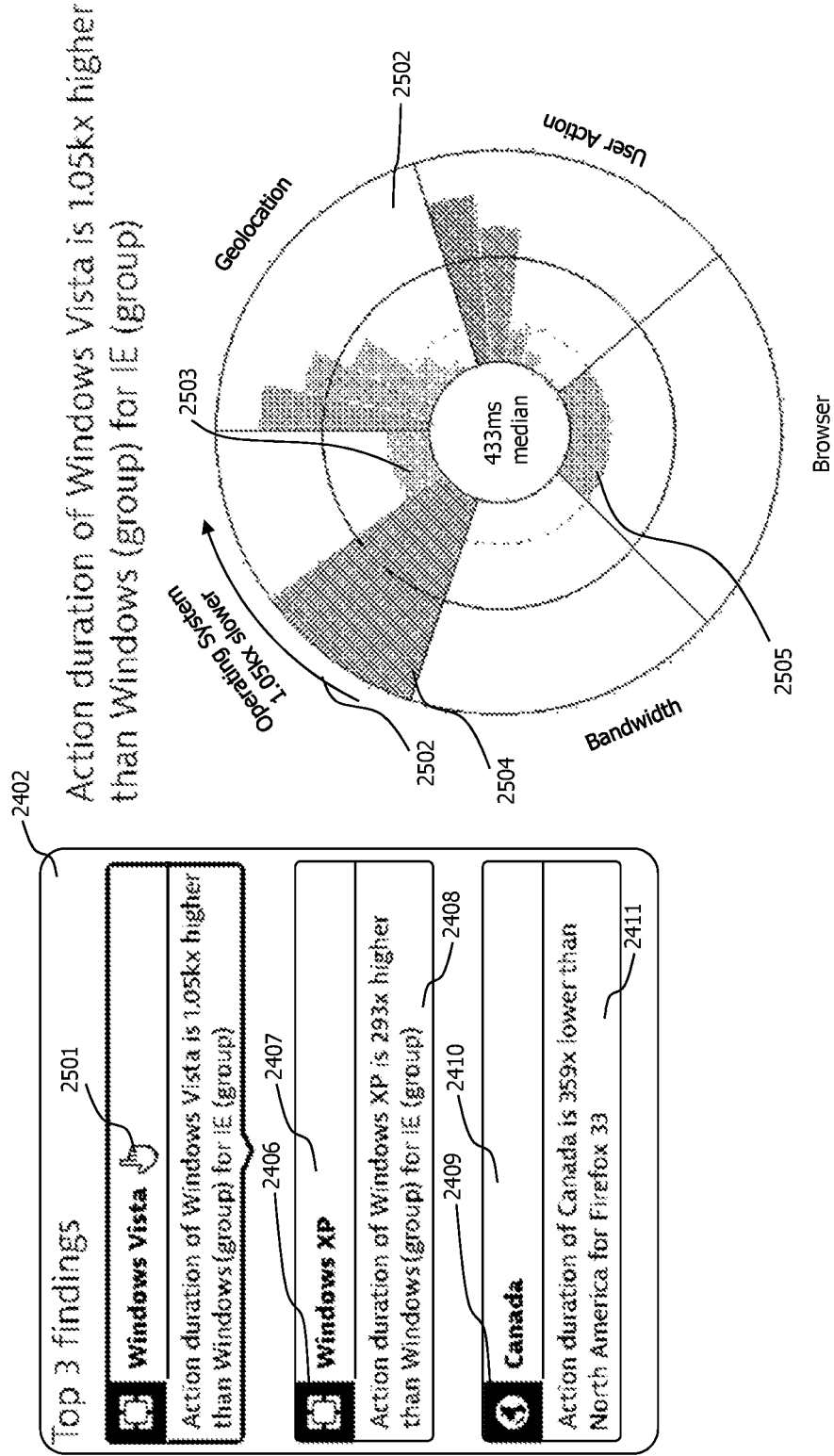
FIG 25: Detailed Visualization of identified Anomaly

METHOD AND SYSTEM FOR REAL-TIME, LOAD-DRIVEN MULTIDIMENSIONAL AND HIERARCHICAL CLASSIFICATION OF MONITORED TRANSACTION EXECUTIONS FOR VISUALIZATION AND ANALYSIS TASKS LIKE STATISTICAL ANOMALY DETECTION

CROSS-REFERENCE TO RELATED APPLICATIONS

This application claims the benefit of U.S. Provisional Application No. 62/200,875 filed on Aug. 4, 2015 and U.S. Provisional Application No. 62/335,725 filed on May 13, 2016. The entire disclosures of each of the above applications are incorporated herein by reference.

FIELD

This invention generally relates to the categorization of monitored transaction execution according to multidimensional transaction characteristics and specifically to identifying sets of multidimensional and hierarchical transaction categories with highest transaction load as basis for performance and behavior related statistical analysis.

BACKGROUND

The end-user perceived performance of services provided by web-applications is influenced by various execution context factors including the type of service requested by the user, the web-browser used to send a request for the service and display the service result, the operating system used to execute the web-browser of the end user or the geographic location and the internet connection of the end user.

Monitoring systems capable to identify, trace and measure individual transaction executions starting from a web-browser side activity, over sending a response to a web-server, processing this request and returning a corresponding response and finally rendering the response on the web-browser, provide large sets of transaction specific measurement data that allow assessing performance and functionality of monitored transaction executions. This transaction trace data typically also contains, beside measurements, data describing the execution context of the monitored transactions.

The generated, execution context aware transaction trace and monitoring data enables to specify transaction categories that were performed in a similar execution context and thus are expected to show similar behavior in terms of performance and functionality. As those context factors are independent from each other, the maximal number of transaction categories is equal to the Cartesian product of the domains of the different context factors. The domains of the individual context factors may be moderate, as an example, the number of different web-browser or operating systems may range between 10 and 100 and the number of different geo locations may, depending on the desired granularity, range between several hundred to some thousands. Although the individual ranges of the context dimension seem manageable, the number of possible context factor combinations describing individual transaction categories quickly reaches a count that make it impractical or even impossible to monitor all of them.

However, the majority of those possible transaction categories either contains no transactions or contain not sufficient transactions to perform reliable statistical tests. It would be desired to identify and monitor only those transaction categories containing sufficient transactions, and in case of limited number category monitoring capacities, to also sort transaction categories according to the number of transactions contained in the categories and to select the categories showing the highest transaction frequency for monitoring.

The hierarchical structure of transaction context factors may be utilized to identify a set of transaction categories that is optimized to the requirements of statistical analyses and to restricted transaction category monitoring capacities.

In a simplified example, transactions may be received from different smaller geolocations like individual cities, and those transactions may be executed by web-browser of one specific type but with different versions. None of the most specific transaction categories may contain sufficient transactions for statistical analysis. It would now be intuitive to merge those specific transaction groups into more generic groups by e.g. grouping on the geolocation dimension on a state or country level instead of a city level or on a web-browser type level instead of a web-browser version level. In addition, it would be desired to optimally use the transaction category monitoring capacity of the monitoring system. In case e.g. the monitoring capacity would allow five additional categories and a category merge according to the geolocation dimension would result in three additional categories and merge according to the web-browser dimension would result in four additional categories, a merge according to web-browser dimension would be preferred as it would better use the category monitoring capacity of the monitoring system.

Consequently, a system and method is required that automatically identifies an optimized set of transaction categories containing the transaction categories with highest transaction frequency, while guaranteeing a minimum per category transaction frequency according to the requirements of used statistical analysis processes. In addition, the system should also maintain a maximum size of the transaction categories set to optimally use the capacities of the monitoring system.

As the transaction monitoring and tracing data is generated in real-time, and the monitoring system reports all transaction execution, a system that identifies an optimized set of transaction categories has to cope with a constant, high level input data stream. Consequently, a one pass process that analyzes each transaction trace only once to determine an optimized set of transaction categories is desired.

This section provides background information related to the present disclosure which is not necessarily prior art.

SUMMARY

This section provides a general summary of the disclosure, and is not a comprehensive disclosure of its full scope or all of its features.

The disclosed analysis technology for transaction tracing data is directed to determine an optimal set of transaction categories in a multidimensional and hierarchical transaction classification space. The dimensions of the transaction classification space may contain a geolocation dimension describing the geographic location of a web-browser that triggered a monitored transaction, an action dimension describing the web-browser side action that was executed to trigger the transaction like a "search" or "purchase" action, a web-browser and operating system dimension describing version and type of the web-browser and operating system on which the action corresponding to the monitored transaction was executed, and a dimension describing the network link used by the computer system of the end-user to connect with the Internet.

Most of those classification dimensions have a natural hierarchical structure, where multiple classification values at a specific hierarchical level can be subsumed by one classification level at the next more generic level. Incoming monitored transactions contain classification data representing a classification characteristic at the most specific level in all classification dimensions.

As an example, the geographic classification dimension contains a first hierarchy level "all" or "world", followed by a "continent" level etc., down to geographic locations as small a city or a part of a city. Another example are the classifications describing version and type of used web-browsers and operating systems. Those classification dimensions may hierarchically be organized by a mobility type, dividing between mobile (e.g. for smart phones or tablet) and desktop operating systems or web-browsers. A subsequent hierarchy level may contain different types (e.g. Microsoft Windows™, Linux, Google Chrome™ or Apple Safari™ web-browser) of operating systems and web-browsers, which is followed by a hierarchy level describing individual versions of operating system and web-browser types. The version information may in turn be subdivided in a major and minor version hierarchy level.

The system determines the category exactly matching the classification coordinates of the incoming transaction and all categories with more generic classification coordinates also matching the incoming transaction. The incoming transaction accounts for the transaction frequency of the exact matching category and for the frequency of the categories with matching, more generic classification coordinates. As an example, for an incoming transaction with a browser geolocation "Vienna", a browser type and version "Internet Explorer 9", an operating system and version "Windows 8.1", action "buy" on a "product detail" page and a network link type "DSL", the exactly matching category would have the same classification characteristics. The more generic matching categories contains all categories with classification characteristic matching any combination of classification characteristics of more generic hierarchical classification levels. In this example those would e.g. include for the geolocation classification "Austria" on state/country level, "Europe" on continent level and "All", for the browser type and version classification "Internet Explorer", "Desktop Browser" and "All" and so on.

During analyzing of transactions and calculating the frequency of transaction categories, the system maintains a sorted list of limited size containing the transaction categories with the highest frequencies, sorted descending according to their transaction frequency. This list represents the transaction categories that are most interesting for statistical analysis and may be used to calculate per transaction category baseline data.

As the frequency accounted for categories with specific classification coordinates is also accounted for categories with all matching, more generic classification coordinates, more generic categories always have at least the same frequency than corresponding more specific categories. As a consequence, in case a transaction category is in the list of categories with highest frequencies, then also all its corresponding more generic categories are in this list.

Accounting transaction frequencies also for all more generic, matching transaction categories causes the multidimensional, hierarchical transaction classification space to fill with identified high transaction frequency categories from generic classification levels to specific classification.

The list of top transaction categories with highest transaction execution frequencies may be used to identify sets of transaction executions performed in a historic reference time period, according to transaction classification parameters matching the classification coordinates transaction categories. Those identified sets of transaction executions may further be used to calculate top category specific, statistical baseline data describing executions of transactions corresponding to specific top transaction categories that were performed during the reference period. The calculation of top categories and baseline data may be based on transaction executions from identical, overlapping or distinct reference time periods. Multiple sets of baseline data may be calculated for one top category list depending on different reference periods.

Some embodiments of the disclosed technology may use one-pass processes and algorithms with limited and predictable CPU and memory requirements to estimate the transaction categories with highest transaction frequencies.

Other embodiments of the disclosed system may use a top category list describing the transaction categories with highest transaction execution frequency form a historic reference period to categorize current transaction executions by assigning transactions that are being currently executed to matching top categories. Those embodiments may calculate statistical data describing the performance and behavior of current transactions matching specific top categories. The current statistical data for the top categories may then be compared with historic statistical data of corresponding top categories to identify deviations between historic and current transaction executions.

Variants of those other embodiments may use a discrete sliding window approach to provide statistical data describing performance and functionality of current transaction executions. It is typically more efficient to merge statistical parameters describing a set of smaller time periods into statistical parameters of a larger time period, than recalculating the statistical parameters for the larger time period. The monitoring system may utilize this by e.g. calculating statistical data representing one-minute time slots every minute, and then perform a merge operation of the last five one minute slots to create statistical parameters representing the last five minutes. This way, each data describing a one-minute slot can be reused five times, which improves the efficiency of the analysis subsystem.

Yet other embodiments may, to improve scalability, employ distributed methods to process transaction data to generate a list of top-frequency transaction categories, corresponding baseline data and to create corresponding, transaction category specific data representing current transaction executions as input for statistical testing.

Still other embodiments may analyze the proportions of measurement values of different transaction categories to e.g. identify unexpected deviations between measurement values corresponding to related transaction categories. As an example, the measured average response time for a specific action may be similar for most browsers of a browser family and is also similar to the average response time measured for the browser family, but for one specific browser version the average response time is significantly higher. This indicates that the monitored application does not cope well with the environment provided by this specific browser version and a browser version specific optimization of the monitored application may be required.

An automated analysis and comparison of measurement values for different transaction categories would reveal such browser version related performance issues and help an application operator to identify appropriate counter measures.

Variants of those embodiments may analyze the proportions of measurement values of different transaction categories by considering multiple dimensions. Continuing the above example, the comparison of measurement values may in addition consider deviations according to the geographic location of the browsers originating the monitored transactions. This may e.g. reveal that the above identified browser version specific response time degradation only occurs for browser situated in a specific geographic location with a specific language. This may indicate that the performance problem is in addition to a specific web-browser version also related to the adaptation of the monitored application to the specific language. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides an overview of a monitoring system consisting in agents deployed to monitored web-browsers and application processes, and a monitoring server receiving transaction trace data fragments to create end-to-end transaction trace data which is analyzed to identify top-frequency transaction categories as input for statistical analysis.

FIG. 2 shows an overview of a variant of a monitoring system using distributed end-to-end transaction trace data generation and top-frequency category detection.

FIGS. 3A-B conceptually depicts data records to store end-to-end transaction trace data and transaction categories.

FIGS. 4A-D show examples of hierarchical levels of classification dimension.

FIGS. 5A-B show examples of tree-structured, hierarchical levels of classification dimension characteristics.

FIGS. 6A-B show and compares examples of fragmented and complete categorization hierarchies.

FIG. 7 shows a tabular representation of an exemplary rank sorted, three dimensional set of transaction categories with complete categorization hierarchies.

FIG. 8 shows a block diagram of a historic top category extractor which evaluates existing, historic end-to-end transaction data records to identify the matching top categories of those historic end-to-end transactions.

FIG. 9 provides a flow chart of the process performed by the classification hierarchy resolver to create a sorted list of classification coordinates matching a received end-to-end transaction trace data record.

FIG. 10 shows the processing of a sorted list of classification coordinates by the top category estimator to update a current top category estimation to incorporate the received classification coordinates list.

FIG. 11 depicts a flow chart showing the process of providing a top category estimation list with limited size as performed by the historic top category extractor FIG. 12 provides a flow chart of the process that merges multiple, partial top category estimation lists into one global top category list.

FIGS. 13A-B show data records that may be used to store descriptions of historic and current top categories.

FIGS. 14A-B visually describes the identification of matching historic top categories for an incoming current end-to-end transaction.

FIG. 15 provides a flow chart describing the process of identifying the relevant historic top categories for an incoming end-to-end transaction trace data record.

FIG. 16 shows a block diagram of a historic top category description extractor, which creates historic top category descriptions out of an existing top category list and historic end-to-end transaction trace data records.

FIG. 17 shows a block diagram of a current top category measure extractor, which creates current top category measure records out of an existing top category list and current end-to-end transaction trace data records.

FIG. 18 shows a flow chart describing a process that cyclically updates historic top category descriptions, using a given historic top category list and an updated historic reference period to create historic top category descriptions considering the new historic reference period.

FIG. 19 shows a flow chart describing process using a discrete sliding-window to periodically update current top category measure records according to new received end-to-end transaction trace data records.

FIG. 20 depicts the process that cyclically performs statistical tests with historic top category description records and corresponding current top category measure records to detect statistically relevant deviations of current and historic data describing performance and functionality of transactions belonging to top categories.

FIG. 21 provides an exemplary, summarizing visualization of top categories that shows the response time of transaction executions according to the detected top categories.

FIG. 22 shows an exemplary visualization of the response times of a set of current top category measures where the top categories considered for the visualization are filtered according a specific value of a specific classification dimension.

FIGS. 23A-D illustrates the process to identify unexpected deviations between measurement values corresponding to different categories of a category hierarchy.

FIG. 24 provides an exemplary combined visualization of a category hierarchy together with a set of anomalies of category measurements detected in the category hierarchy.

FIG. 25 contains an exemplary visualization of category hierarchy data corresponding to a selected category measurement anomaly Corresponding reference numerals indicate corresponding parts throughout the several views of the drawings.

DETAILED DESCRIPTION

Example embodiments will now be described more fully with reference to the accompanying drawings.

The described embodiments are directed to create a sufficiently accurate approximation of an optimized set of transaction categories, where the transaction categories are described in a multidimensional, hierarchical classification space. The created set has a predictable limited size, allowing a real-time or near real-time processing of the set. Typically, more generic transaction categories contain more transactions because they cover a larger area of the classification space than more specific transaction categories and more transactions match those more generic transaction categories. A greater set of transactions for a transaction category increases amount of data available to generate statistical data describing the transaction categories, which improves the quality of the statistical data. However, those more generic categories also match a wider range of different transaction variants having deviating, transaction variant specific performance and functional behavior, which increases the overall deviation of input data available to generate descriptive statistical data, which may decrease the quality of the generated statistical data. The transaction categories contained in the optimized transaction category set are optimized in a way to represent those transaction classifications containing the largest sets of transactions while providing hierarchical classification characteristics that are as specific as possible which in turn leads to transaction sets matching those categories that are as homogeneous as possible.

A simplified example considering only the geographic and the web-browser dimension, transaction data may be received with geographic location "Austria", "Germany", "Vienna, Austria", "Berlin, Germany" and the detected web-browsers may contain "Mobile Safari 6", "Internet Explorer 9" and "Mobile Chrome 39". Most of the transactions may come from the geographic location "Berlin, Germany" while most transactions may use a mobile browser. In case only six resulting transaction categories are desired, the system would create a category "Word"/"All Browsers" representing all transactions, a category "World"/"Mobile Browsers" representing all transaction originated from mobile browsers, a category "Europe"/"All Browsers" representing all transactions originated in Europe, a category with coordinates "Germany"/"All Browsers" representing all transaction originated in Germany, a category with coordinates "Berlin, Germany"/"All Browsers" representing all transactions originated in Berlin, Germany and a category with coordinates "Europe"/"Mobile Browsers" representing transactions originated in Europe on a mobile browser.

The large amount of transaction trace data produced by monitoring systems does not allow the CPU, memory and time consuming exact calculation of such an optimized top category set. However, a process that generates an estimation of those top categories with a predictable estimation error is sufficient. Key constraints for such an estimation process are that it considers each transaction trace only once and that it has predictable memory requirements that are not growing with an increasing numbers of analyzed transactions.

FIG. 1 provides an overview of a monitoring system using a top category detection mechanism to group and analyze monitored transaction executions in an optimized way. The system receives transaction trace data fragments created by agents to describe the execution of monitored transactions which are used to create end-to-end transaction trace data. A set of generated end-to-end transaction trace data is processed to create an optimized transaction category set that may further be used to perform statistical tests per transaction category.

Web-browsers 127 and backend processes 133 and 138 are monitored by browser agents 130 and backend agents 136 that are injected into the monitored browsers 127 and backend processes 133 and 138 in a transparent and non-intrusive way. The agent injection may either be performed manually or by the monitoring system. Those agents instrument code being executed on monitored web-browser and backend processes with sensors 128 and 134. The sensors detect and monitor the execution of instrumented code and create measurement and correlation data that enables to identify individual transaction executions. The sensors 128 and 134 forward 129 and 135 measurement and correlation data to the agent 130 and 136 deployed to their respective web-browser 127 or backend process 133 and 138. The agents 130 and 136 receive the measurement and correlation data and may in some embodiments perform a correlation of measurement and correlation data describing the web-browser or backend process local execution of individual transactions and send those pre correlated transaction trace data fragments 125 to an event correlator 102 which combines those per web-browser or process transaction trace data fragments into end-to-end transaction data records 107. The agent side pre correlation may e.g. be based on monitored code executions that executed within one thread. In other embodiments, the agents may not perform such per process pre correlation and send the monitoring and correlation data received from sensors directly to an event correlator 102 to create end-to-end transaction data records 107.

Monitored web-browsers 127 are connected to backend processes 133 via a computer network 132 which is e.g. used to send requests and responses caused by the execution of a monitored transaction 131. Sensors 128 and 134 deployed to web-browsers and backend processes detect sending and receiving of those requests and responses and create correlation data that may be used by the event correlator 102 to identify and combine corresponding transaction trace data fragments describing sender and receiver side activities. In case a backend process 133 performs communication with another backend process 138 via another computer network 137 to fulfill a monitored transaction, similar monitoring mechanisms that allow to identify transaction trace data describing corresponding sender and receiver side processing of monitored transactions are in place.

The browser agents 130 are connected to a monitoring sever 101 via a network connection 124 that may be identical with the network connection 132 that web-browsers 127 use to communicate with backend processes 133 to execute transactions.

Agents 130 deployed to backend processes 133 and 138 are connected to a monitoring server 101 via a network connection 126 that may be different to the network connection used by browser agents.

The monitoring server receives transaction data fragments 125 from various browser agents 127 and agents 136 deployed to backend processes and forwards those transaction trace data fragments 125 to an event correlator 102, which identifies and combines transaction trace data fragments 125 describing parts of individual end-to-end transactions into end-to-end transaction trace data records 107. Completed end-to-end transaction trace data records 107 are stored 105 in a transaction repository 106 for further analysis and visualization. A transaction repository may store end-to-end transaction trace data either in main memory, on a hard disc or in a database or in a combination thereof. A historic top category extractor 110 cyclically fetches 108 end-to-end transaction trace data records 107 from the transaction repository 106 corresponding to a specific historic time period. The historic time period may be described as the 24 hours of yesterday, the last week, the same day or yesterday within the last week or similar. The historic top category extractor 110 analyzes the fetched end-to-end transaction traces 107 to identify a list of predictive and limited size, the list contains those transaction categories within a multi-dimensional and hierarchic classification space that contain the most transactions. This identified list of transactions categories is optimized to contain the transaction categories representing the largest sets of transactions while having the most specific transaction classification characteristics. The top category extractor 110 creates an estimated top category list 112 which fulfills those contradicting requirements while maintaining a maximum allowed number of categories in the list. The historic top category extractor evaluates each transaction trace only once and also maintains a limited memory consumption during the calculation of the top category list, depending only of the maximum allowed size of the top category list.

The top category list 112 representing a given historic time period is used by the historic top category description extractor 114 to create data that statistically describes the identified top categories. The historic top category description extractor fetches the end-to-end transaction traces corresponding to each transaction category that fall into the considered historic reference time period and creates transaction category specific data in form of time series or statistical parameters like quantiles that describe the transaction categories within the considered time period. The created category description data is stored in a historic top category description repository 119.

A current top category measure extractor 104 cyclically fetches 103 end-to-end transaction traces representing the current time period from the event correlator. The transactions representing the current time period may be defined as those transactions finished in the last 1, 5 or 15 minutes or the new finished transaction traces not yet processed by the current top category measure extractor 104. The current top category measure extractor 104 extracts classification coordinates from the received current end-to-end transaction traces 107, fetches applicable historic top category descriptions 1301 from the historic top category description repository 119, and updates or creates top category measure records 1310 corresponding to the applicable historic top category descriptions 1301.

The determination of applicable historic top category descriptions may best be shown by an example. The geolocation dimension of the historic top categories may e.g. contain the locations "World", "Europe" and "Germany". It is noteworthy that these locations are connected by a hierarchical relationship, where a location with a lower hierarchy is contained in a location with a higher hierarchy. A received transaction trace data may indicate that it was triggered by a web-browser located in "Vienna, Austria". The current top category measure extractor may determine that "Vienna, Austria" is situated in "Austria" and that "Austria" is a part of "Europe". It may further determine that the geolocations of historic top category description records contain the locations "World" and "Europe". The most specific geolocation of a top category matching the incoming transaction trace data is "Europe", and the only more generic geolocation containing "Europe" is the geolocation "World". As a consequence, the geolocations "Europe" and "World" are selected for the incoming transaction trace data.

The corresponding top category measure records 1310 contain measurement and statistical data that describes the current performance and behavior of transactions of a specific category. After receiving new transaction trace data and determining the corresponding top category measure records, the measurement and statistical data of those top category measure records are updated to include data derived from the new transaction traces.

The per transaction classification historic and current data that is available in the historic top category description repository 119 and the current top category measures repository 118 may as an example be used by a top category visualization unit 116 to provide means to visualize and navigate through the multidimensional and hierarchical transaction classification space or by a top category statistical anomaly detection and alerting unit 117 which uses the per category data to perform high-quality statistical tests to identify and notify anomalies and deviations between the data describing category specific current and historic reference transaction executions. The anomaly detection and alerting unit 117 may perform statistical test processes to detect e.g. deviations of transaction response times or error rates similar to the system described in U.S. patent application Ser. No. 14/338,707 "Method and System for Real Time, False Positive Resistant, Load Independent, Self-Learning Anomaly Detection Of Measured Transaction Execution Parameters Like Response Times" by Greifeneder et al. which is included herein by reference in its entirety. The creation of end-to-end transaction data records 107 out of transaction trace data fragments created by agents and browser agents may be performed according to the teachings of U.S. Pat. No. 8,234,631 "Method and System for Tracing Individual Transactions at the Granularity Level of Method Calls Throughout Distributed Heterogeneous Applications without Source Code Modifications" by Greifeneder et al. and U.S. patent application Ser. No. 13/722,026 "Method and System For Tracing End-to-End Transactions, including Browser Slide Processing and End User Performance Experience" which are both included herein by reference in their entirety.

A block diagram describing an embodiment that performs transaction trace data fragment correlation to create end-to-end transaction traces and creation of partial historical top category lists in a distributed and parallel way is shown in FIG. 2. Such a distributed setup increases the scalability of the monitoring system as in case of an increased number of monitored transactions, the capacity of the monitoring system could be increased by simply increasing the number of distributed event processing units and distributed current top category measure extraction units.

Multiple distributed event processing units 202 receive transaction trace data fragments 125 describing parts of monitored transactions 131 from a set of agents 136 and browser agents 130. The browser agents and agents dispatch the created transaction trace data fragments to distributed event process modules in a way that all transaction trace data fragments describing one monitored transaction are sent to the same distributed event processing unit 202. This may e.g. for a monitoring system setup that monitors multiple, independent applications be implemented by assigning agents and browser agents to multiple distributed event processing units 202 on a per application basis. Such an assignment would assure that all transaction trace data fragments of an application would be sent to a single distributed event processing unit 202, which would further assure all transaction trace data fragments describing a monitored transaction would be received and processes by the same event processing module. In cases where the load of a single application increases to a size that is not manageable by a single distributed event processing engine, a per monitored transaction based assignment of transaction trace data fragments 125 may be employed. As an example, the agent 130 or 136 that first recognizes a new monitored transaction may determine the distributed event processing unit 202 to which it sends trace data describing this monitored transaction. Data allowing to identify this event processing unit 202 is passed with all correlation data that is generated by the monitoring system and attached to all kinds of messaging data sent to fulfill the monitored transaction. Agents 136 deployed to processes 133/138 that receive those messages may extract and use this processing unit identification data to choose the appropriate event processing module 202 to which tracing data fragments 125 describing the processing of the received message should be sent.

Each distributed event processing unit 202 consists in an event correlator 102, a transaction repository 106, a historic top category extractor 110 and a historic top category description extractor 114 which operate and collaborate as described in FIG. 1, except that they do not process all transaction trace data but only a fraction of it. In addition, each historic top category extractor 110 only produces a partial top category list 204 and each historic top category description extractor only produces a subset 208 of top category description records. The partial top category lists 204 provided by the historic top category extractors 110 of all distributed event processing units 202 are received by a historic top category merger 206 that combines them to form a top category list that considers all end-to-end transaction traces 107 produced by all distributed event processing units. The created top category list 112 is provided to the historic top category description extractor 114 of each distributed event processing unit 202 which uses it to create a subset of historic top category description records 1301. The created top category description records only consider the end-to-end transaction data records 107 stored in the transaction repository 106 of the enclosing distributed event processing unit 202. A historic top category description merger 209 receives the top category description records from all distributed event processing units 202 and merges them into a global historic top category description repository 119.

A distributed current top category measure extraction unit 212 is associated to each distributed processing unit 202 which cyclically fetches 211 end-to-end transaction trace data records 107 representing currently executed transactions from its associated distributed event processing unit 202. Each distributed current top category measure extraction unit 212 accesses 121 the historic top category description repository 119 to identify the applicable historic top categories for each fetched current transaction and to create or update corresponding category measure records 1310 to represent the fetched current transaction traces. As in the not distributed embodiment, historic top category description data 119 and current top category description data 118 may be used for visualization 116 or anomaly detection 117.

Data records that may be used to store end-to-end transaction trace data and a top category list are conceptually depicted in FIG. 3. An end-to-end transaction trace data record 107 as shown in FIG. 3a, may contain but is not limited to an identifier 301 which uniquely identifies an individual transaction trace, the identifier 301 may be a combination of an identifier for a process execution on a specific computer system and an identifier for a specific thread execution by the process, or combination of an identifier for a web-browser session, an identifier for an individual content view on the web-browser and an identifier for an action executed on the content, a type 302 which may distinguish transaction traces starting at a web-browser from transaction trace starting at a backend process, classification parameters 303 which specify the coordinates of the transaction trace in a multidimensional classification space, and transaction performance and trace data 310 which may describe the processing steps performed to fulfill the monitored transaction on the granularity level of individual method executions.

In contrasts to transaction performance and trace data 310 which describes the internal processing and behavior of a monitored transaction, the classification parameters 303 describe the context in which the monitored transaction was executed and the type of functionality desired by the execution of the transaction. Classification parameters 303 may contain but are not limited to a geolocation entry 304 describing the geographic location of the web-browser on which the transaction execution was triggered, a browser entry 305 describing type and version of the web-browser used to trigger the transaction, an operating system entry 306 describing type and version of the operating system on which the transaction execution was triggered, a connection type entry 307 describing the type of internet connection that was used to connect the computer system on which the transaction was triggered with the internet and an entry action field 308 describing and identifying the type of activity performed to trigger the monitored transaction.

The structure of a top category list 112 is conceptually described in FIG. 3b, which consist in a sorted set of category list entries 321. The number of category list entries 321 in the list is limited to a fixed maximum size. A category list entry 321 may contain but is not limited to a list of classification coordinates 322 identifying the location of the described category within a multidimensional, hierarchical classification space, a category quantity measure 326 describing the number of transactions matching the category and a category update sequence entry 327 allowing to determine a sequence of updates performed to different category list entries 321. Classification coordinate entries 323 may contain but are not limited to a classification dimension entry 324 which determines a specific dimension in a multidimensional classification space, like geolocation, web-browser or operating system etc., and a classification characteristic entry 325 which determines the concrete characteristic of the dimension, like a specific geolocation, web-browser or operating system on a particular hierarchy level. In contrast to classification parameters 303 contained in end-to-end transaction trace data records 107 which describe classification coordinates at the most specific hierarchy level, a classification characteristic 325 of a classification coordinate 323 may describe a classification coordinate at any hierarchy level. More specific, and by example of the browser type dimension, a classification parameter 303 received with an end-to-end transaction trace always fully specifies browser type, family and version, determining the classification characteristic of a classification coordinate from highest to lowest hierarchical level. A classification characteristic 325 of a classification coordinate 323 of a category list entry 321 may in contrast describe a more generic classification coordinate value by omitting lower hierarchy levels, like for the example of the browser type dimension, version and family of the browser, as long as a value for the highest hierarchy level is specified and no intermediate hierarchy levels are omitted. As an example, a generic classification coordinate may not specify value for the browser family level without specifying a value for the type level. Different classification coordinates 322 of one category list entry 321 may describe a classification characteristic at different hierarchy level. As an example, the classification coordinates of a category list entry 321 may describe the browser dimension down to the browser version, but the geolocation dimension may only be specified to the highest geographic location. Such a situation may e.g. occur when an application is used worldwide, but requires a specific browser type, family and version.

The classification coordinates list 322 may contain classification coordinate entries 323 corresponding to all or a subset of the available transaction classification parameters 303.

The category list entries 321 in a top category list 112 are sorted descending by the value of their category quantity measure 326. In case multiple category list entries with equal category quantity measure value exist, they are sorted according to the category update sequence in a way that the later update entries are below earlier update ones. The sort criteria and limited maximum size restrictions of a top category list are maintained by a top category estimator 802, which is a component of the top category extractor. For a detailed description of the process that creates a top category list while maintaining sort criteria and size restriction, please refer to FIG. 10 and corresponding description.

Referring now to FIG. 4, which shows hierarchical levels of exemplary classification dimensions. Hierarchy levels for the geolocation dimension are depicted in FIG. 4a and in this example show a top hierarchy level "All" 401, enclosing all considered geographic locations, e.g. the whole world, which is superior 443 to a second hierarchy level "Continent" 402 that in turn is superior to a third geographic location level "State/Country" 403 which as a sub hierarchy level "City/Region" 404. The relations 443 between adjacent hierarchy levels indicate that an instance of a superior level contains all instances of its sub level. The hierarchy levels for the web-browser dimension are shown in FIG. 4b. This dimension may contain the hierarchy levels "All" 411, "Type" 412, "Family" 413 and "Version" 414. An operating system dimension may show similar hierarchy levels. The exemplary hierarchy levels of the internet connection dimension are shown in FIG. 4c and they may contain a level "All" 421 and a level "Bandwidth" 422. The hierarchical levels of the action dimension, which indicates the type of functionality monitored transactions provide is shown in FIG. 4d. In this dimension, the top hierarchy level is an "Application" 431, representing a whole monitored application. The monitored application may be structured into different pages, which is modelled with the hierarchy level "Page" 432. For a web application, a specific HTML content page may represent a "Page" which may be identified by the URL that returns the specific HTML content. Those pages may provide various means to interact with the application and to trigger transaction executions which is modelled by the hierarchy level "Action" 433. In the context of a HTML based application, "Actions" may be represented by user interaction elements like forms or buttons contained in HTML content, that may be used to initiate an interaction with the web application. The action dimension as exemplary depicted in FIG. 4d describes user triggered actions that caused the execution of monitored transactions on different hierarchical aggregation levels.

Exemplary hierarchical trees of the geolocation and the action dimension are displayed in FIG. 5. A hierarchical tree describing possible characteristic of the geolocation dimension as shown in FIG. 5a may contain a root element "All" representing all geographic locations in the topmost hierarchy level, an inferior hierarchical level describing different continents may contain elements like "Asia" 502, "Europe" 503 and other 504 continents. The country hierarchy level below "Asia" 502 may contain elements describing countries and states of Asia, like "China" 505 and other countries and states of Asia 506. The country hierarchical level below "Europe" 503 may contain elements describing European countries and state like "Germany" 507 and "Austria" 508. Same occurs for entries in the city/region hierarchy level, which contains elements describing cities or regions of the superior stat/country element like "Beijing" 511 for "China" 505 or "Linz" 512 for "Austria" 508.

An exemplary hierarchy tree for the action dimension of a specific application is shown in FIG. 5b. The top hierarchy level of the tree identifies a specific application, in this example the application "myApp" 531 followed by entries on the page level hierarch describing different pages of the application like a "Login Page" 532, a "Catalog Page" 533 and other pages 534. The action hierarchy level may contain a "Login" 535 action for the "Login Page" 532 and a "Search" 537, "Browse" 538 and a "Purchase" 539 entry representing the actions provided by the "Catalog" 533 page. Some variant embodiments may omit the page hierarchy level and only provide an action hierarchy level below the application level.

Top category lists in a multidimensional, hierarchical classification space, where higher, more generic classification levels subsume all data of corresponding lower, more specific classification levels typically start to fill from most generic classification levels and then expand to more specific classification levels according to the classification parameters 303 of the end-to-end transaction data records corresponding to an analyzed reference time period. This process creates in most cases a top category set which is complete in terms of the hierarchical classification parameters of its top categories. This means that for each top category in the set exist all variants of other, more generic "parent" top categories up to the most generic top category. Such top category list may be denoted as "complete top category list". However, due to the size restriction of the top category list that has to be maintained, top category list may occur that do not contain all parent top categories for each contained top category. Such a situation occurs when e.g. two top categories with an identical and lowest category quantity measures 326, with related classification parameters (e.g. one for a specific country, the other for a specific city in the country) exist, and one of them has to be removed from the list. In case the one with the more generic classification parameters is removed, the remaining top category is missing one of its direct parents. Such a top category list may be denoted as "fragmented". To provide a balanced set of top categories, a complete top category set is desired. The potential undesired effects caused by a fragmented top category list are best described by an example. A fragmented top category list may contain a top category for a specific city, but not for the country containing this city. Current transactions originating from the specific city could be evaluated using the very specific baseline data of this city whereas current transactions from other cities of the country need to be evaluated using the less specific baseline data of the continent containing the country. This would introduce undesired and avoidable deviations in the quality of the statistical anomaly detection process.

A visual comparison of a fragmented and a complete set of top categories in a multidimensional hierarchical classification space is shown in FIG. 6. To facilitate the understandability of text and drawings and to avoid unnecessary complexity, the number of dimensions is in this example reduced to two but the described concepts are applicable to an arbitrary number of dimensions.

FIG. 6a depicts a set of top categories of the dimension geolocation and web-browser that shows a fragmentation in the web-browser dimension. The geolocation and web-browser dimensions form a plane that contains coordinates describing no top categories 630, and coordinates describing top categories, like coordinates 610, 611, 612. 613 and 614 as in the fragmented scenario shown in FIG. 6a. Each top category coordinate, with exception of the top level category 610 has at least one parent top category which has at least one classification coordinate that is in a higher hierarchy level. Those parent relationships are denoted by arrows 620, 621, 622 and 623 in the fragmented scenario. This scenario shows two top categories 612 and 611 describing a distinct country 603 or continent 602 while not distinguishing between different browser, one top category 613 for a specific continent 603 and a specific browser type 606 and one top category 614 for a specific browser family and no specific geolocation. Top category 614 has a parent relationship with top category 610 which skips the web-browser classification hierarchy level type 606. As this hierarchy level is missing, the list of top categories shown in FIG. 6*a* is fragmented.

A fragmented top category list potentially has undesired effects on the usage of such a top category list for statistical analyses. For statistical analyses aimed to detect deviations between a set of historic transactions and an individual current transaction or a set of current transactions, it is desired to find the set of historic transactions that best matches the current transactions in terms of classification dimensions, as those historic transactions were executed under the most similar contextual influences as the current transactions. With a fragmented historic top category list as described in FIG. 6*a*, transactions having another browser family than the browser family specified in top category 614 need to be compared with historic transactions considering all browsers, whereas transactions matching the browser family can be compared with a much more specific reference group. As aforementioned, this would lead to undesired deviations in the quality of the results provided by those statistical tests. To minimize those undesired effects, a complete top category hierarchy, as described in FIG. 6*b* is desired. An extreme form of a fragmented top category hierarchy would be one where the root top category 610 is missing. In such a scenario, no reference data would be available for current transactions that match none of the existing top categories.

The complete top category hierarchy as described in FIG. 6*b* is similar to the fragmented scenario, except that top category 614 is replaced by 624 to close the gap in the web-browser dimension hierarchy.

To maintain a complete top category hierarchy in combination with a limited list size constraint, it is required to also sort the top category list in a way that all parent top categories of a specific top category are ranked before the specific top category. These sort criteria may also be referred to as "parents before child" sort criteria.

Referring now to FIG. 7 which graphically illustrates the "parents before child" sort criteria which has to be maintained by the processing performed by a top category estimator 805 to achieve complete top category hierarchies. The exemplary top category table 750 contains a column rank 751 showing the rank of the contained top categories according to their transaction frequency, a column geolocation 752, browser 753 and operating system 754 describing classification specific characteristics of all top categories in the list. The hierarchical relationships between different top categories represented by rows of table 750 are denoted by the arrows 701 to 735, where the arrows point from a parent category to a child category. Arrows 701 to 708 for example, show that all child categories of the most generic category in the first row are listed below their parent. Arrows 721 and 717 show that top category 7 has two parent top categories 6 and 3 which are ranked before top category 7.

During calculation of top categories, the top category estimator 805 determines the most specific category of a transaction trace, and all more generic categories matching the transaction and increases the frequency of all those categories. Consequently, more generic categories typically show higher frequency than more specific ones, which enforces the "parents before child" sort criteria in a natural way. Only in cases where categories with different hierarchical dimensions show the same frequency, this sorting criteria may be broken. As an example, it may be considered that top category 20, with operating system "all" and category 21 with operating system "mobile" show the same frequency. The top category estimator could in this case, by only considering the frequency as sorting criteria, place top categories 20 and 21 in reverse order. In case processing of further transaction traces would reveal another top category which would be inserted above row 20, the last row, which would then show the operating system coordinate "all" would be dropped from the list, but the entry with operating system coordinate "mobile" would remain, creating an undesired fragmented hierarchy. Consequently, it is important that the top category estimator 805 maintains the "parents before child" because it assures that always the most specific top categories are dropped from the list in case processing of additional transaction reveals a more generic top category with higher frequency.

A block diagram of a historic top category extractor 110 which processes transaction traces of a specific historic period to create a list of historic top categories representing this historic period is shown in FIG. 8. A historic top category extractor 110 contains a classification hierarch database 801, which describes the hierarchical structure of available classification characteristics. It contains e.g. data describing possible geolocation hierarchies, web-browser or operating system type, family and version hierarchies and hierarchies of applications, pages and actions. It contains further a classification hierarchy resolver 803, which receives 108 end-to-end transaction trace data records 107 with classification parameters 303 and accesses the classification hierarchy database 801 to determine the classification coordinates matching the classification parameters 303 to create sorted category update lists 811. The sorted category update lists 811 are sent 804 to a top category estimator 805, which processes the received sorted category update lists 811 to update an internal top category list 806 in a way that it considers received sorted category update lists, while maintaining the above mentioned sort criteria, like "parents before child" criteria and sort by frequency and considering the maximum size of the internal top category list. The top category estimator may on request or cyclically 809 provide a truncated top category list 810 which is created by truncating the internal top category list from a maximum size 807 to a truncated size 808. Truncated size 808 may be equal or lower than maximum size. The provided truncated top category list 810 may be used by the monitoring system as top category list 112 or as partial top category list 204.

A sorted category update list 811 contains category update entries 812. Those category update entries may contain but are not limited to a classification coordinates field 322 and a category quantity measure field 813. The classification coordinates 322 identify one specific point in the multidimensional, hierarchical classification space and the category quantity measure 813 contains a measurement value extracted from a received end-to-end transaction trace 107. The category quantity measure 813 may for some embodiments have the constant value 1 for each processed transaction to measure transaction frequencies, it may have a value indicating if the transaction was successful or erroneous to measure transaction failure probabilities or it may contain a measure otherwise describing the transaction, like its response time or CPU time of a transaction to identify top categories based on response time or CPU usage of transactions. The entries of the sorted top category list 811 are sorted in a way that more specific classification coordinates are listed before more generic classification coordinates. This sorting criteria is required by the top category estimator 805 to maintain a top category list with a complete hierarchy. For a detailed description of the processing performed by the classification hierarchy resolver 803 and the top category estimator please refer to FIGS. 9 and 10.

The calculation of a sorted category update list 811 for an end-to-end transaction trace 107 as performed by the classification hierarchy resolver 803 is described by the flowchart shown in FIG. 9.

The process starts with step 901 when a new end-to-end transaction trace 107 is received. Following steps 902 and 903 analyze the received transaction trace 107 to calculate the value of the category quantity measure and to extract the classification parameters 303. Calculating a category quantity measure may include calculating response time or CPU usage of the transaction, determining if the transaction was successful or failed, determining if the transaction execution caused a financial revenue or other technical or financial parameters describing the transaction execution. Those measurement values may be determined by analyzing and processing the transaction performance and trace data 310 which may, next to performance measure data, also contain data describing exceptions or errors occurred during the transaction execution to detect transaction failures, or execution context data like captured method parameter values or return values which could be used to deduct financial or otherwise business relevant events associated with the monitored transaction 131. A type of category quantity measure may be chosen according to the desired semantic of the top categories. For a top category list as used in the described embodiments that detects top categories according to their transaction execution frequency, the type of the quantity measure may be "transaction frequency" and the measurement value may be the constant value 1 for each analyzed transaction. Some other embodiments may detect top transaction categories based on the execution time of each transaction. In this case, the quantity measure may be the "transaction execution time" and the measurement value of the quantity measure may be the execution time of each transaction. Using such a measure would create a top category list containing the categories of transactions that in sum require the highest amount of execution time.

In other embodiments, transaction trace data may be analyzed for method calls indicating the economic impact of the transaction execution, like the value of money for which goods were purchased by the transaction. This value may be used to calculated and identify top transaction categories to detect those transaction categories with the highest economic impact.

In still other embodiments, a top category detection mechanism as described herein may not only be performed on individual transactions, but also on visits describing a set of transactions describing a specific interaction of an end user with the monitored applications. Calculation and monitoring of such visits may be performed according to the teachings of U.S. patent application Ser. No. 13/722,026 "Method And System For Tracing End-To-End Transaction, Including Browser Side Processing And End User Performance Experience" by Greifeneder et al. which is included herein by reference in its entirety. Following the procedures of the disclosed techniques, top categories may be calculated according to the frequency of visits, the number of converted visits (i.e. visits which resulted in a purchase of the customer), the visit conversion rate (i.e. number of visits vs. number of converted visits), the sum of money spent on visits or the number of unique (visits from different users) or recurring (visits from the same user).

Subsequent step 904 determines the most specific classification coordinates corresponding to the extracted classification parameters. This may e.g. include finding for an IP address received as part of the classification parameters the corresponding geographic location and identifying the best matching geographic location stored in the classification hierarchy database 801. Afterwards, step 905 creates a category update entry 812 corresponding to the determined category quantity measure 813 and the most specific classification coordinates and inserts it to an empty sorted category update lost 811.

Subsequently, step 906 determines the set of available more generic classification coordinates for the determined most specific classification coordinates. This may e.g. be performed by determining from each coordinate of the most specific coordinates the path of coordinate values to the most generic coordinate value, and then form all combinations of coordinates out of the determined coordinate values. More specific and by the example of the classification characteristics described in FIG. 5, step 906 may first determine that the most specific classification coordinates for an incoming end-to-end transaction are "Linz" 512 for the geolocation dimension and "Browse" 538 for the action dimension. Afterwards, it may determine for both dimensions the hierarchic characteristics from the identified most specific level to the highest level by following the path through the dimension characteristics tree up to the root node. For the geolocation dimension, the path leads through "Austria" 508 and "Europe" 503 to the root level "All" 501. For the action dimension, the path leads through "Catalog Page" 533 to the root level "myApp" 531. After those dimension characteristics are determined, all combinations of them are created as they form all possible, more generic classification coordinates. In this case, those are the 12 combinations "All"/ "Browse", "All"/"Catalog Page", "All"/"myApp", "Europe"/"Browse", "Europe"/"Catalog Page", "Europe"/ "myApp", "Austria"/"Browse", "Austria"/"Catalog Page", "Austria"/"myApp", "Linz"/"Browse", "Linz"/"Catalog Page", "Linz"/"myApp".

Following step 907 creates a category update entry 812 for each of the more generic classification coordinates detected in the previous step and appends them to the sorted category update list 811 while maintaining a "from specific to generic category coordinates" sort criteria. This may be performed by starting with classification coordinates having only coordinates that have coordinate values that are one hierarchy level more generic than the corresponding most specific coordinate value, followed by coordinate values that are two hierarchy level more generic etc. until category update entries representing all coordinates determined in step 906 are appended to the category update list. Following step 908 provides the created list for subsequent processing, e.g. by a top category estimator 805. Afterwards the process to calculate a sorted category update list ends with step 909.

The processing of sorted category update lists 811 by the top category estimator 805 to update an internal top category list 806 is shown in FIG. 10. The calculation of the top category list uses adaptations of known algorithms and methods to find most frequent elements in stream data which are also known in the art as "space saving algorithms". For a detailed description of these algorithms please see e.g.

"Efficient Computation of Frequent and Top-k Elements in Data Streams", A. Metwally et al., available for download e.g. at https://icmi.cs.ucsb.edu/research/tech_reports/reports/2005-23.pdf.

The flow chart shown in FIG. 10 describes the processing of one category update entry 812 being part of a sorted category update list 811 by a top category estimator 805. The category update entries are processed according to their position in the sorted category update list 811 to assure that update entries corresponding to more specific classification categories are processed before update entries corresponding to more generic classification categories to further assure that no top category entry can be replaced by a later processed more specific top category entry. The process starts with step 1001 when a next category update entry 812 is fetched from a received category update list. Following step 1002 queries the internal top category list 806 for a category list entry 321 with classification coordinates 322 matching the classification coordinates of the currently processed category update entry 812. Decision step 1003 checks if such category list entry was found. In case one was found, the process continues with step 1007 which updates the category quantity measure 326 of the found category list entry to reflect the category quantity measure 813 of the currently processed category update entry 812. Following step 1009 determines if the internal top category list 806 needs to be reordered after the update of the category list entry to maintain the sort criteria of the list and performs a resort in this case. Afterwards, the process ends with step 1011.

In case decision step 1003 determines that no matching category list entry is available, decision step 1004 is executed which checks if the internal top category list 806 already reached its maximum size 807. In case the list is not yet at its maximum size, step 1005 is executed which creates a new category list entry 321 using classification coordinates and category quantity measure of the currently processed category update entry and inserts it into the internal top category list 806 at a position according to its category quantity measure that preserves the sort criteria of the internal to category list 806. The process then ends with step 1011.

In case decision step 1004 determines that the top category list 806 is full, the process continues with step 1006, which first determines the category list entries with the lowest category quantity measure value. As there may exist multiple category list entries with the same category quantity measure value, also multiple category list entries with an equal, lowest quantity measure value may exist. In case of multiple such category list entries, step 1006 continues to determine among those category list entries having the same lowest category quantity measure value the one category list entry that was least recently updated. As the category update entries in a sorted category update list 811 are sorted and processed from most specific to most generic categories, it is assured that more specific top category entries are updated before more generic ones and thus the most specific category entry is also the one that was least recently updated. A category update sequence field 327 which may be used to store the sequence in which category list entries were updated may be used to determine the least recently updated category list entry.

The processing sequence of category update entries also assures that in case a replace is required, more specific list entries are always replaced by more generic list entries. Following step 1008 sets the classification coordinates of the previously identified top category entry to the classification coordinates of the currently processes category update entry and updates the value of its category quantity measure 326 by increasing it by the value of the category quantity measure 813 of the currently processed category update entry 912. This removes the category list entry 321 with the lowest category quantity measure 326 from the list by replacing it with a category list entry 321 with the classification coordinates of the currently processed category update entry and setting its category quantity measure 326 to its theoretical maximum value, according to the teachings of the space saving algorithm to perform an efficient, one pass top category estimation. According to the teachings of the space saving algorithm, the maximum value of the sum of missed, previous quantity measure updates for the new added category list entry is the value of the quantity measure 326 of the removed category list entry. If the sum of missed, previous quantity measure updates would be higher, the currently added category list entry 321 would already be in the internal top category list 806. To set the category quantity measure 326 to its theoretical maximum value, it is set to the sum of maximum quantity measure updates, i.e. the category quantity measure 326 of the replaced category list entry 321, increased by the value of the received category quantity measure 813 of the currently processed category update entry 812. The replace behavior of the space saving algorithm to set the quantity measure value of the new entry to its theoretical maximal value assures that no high frequent categories are missed by accepting false positive failures that incorrectly identify categories as high frequent, especially at the lower end of the list. The probability of such failures can be controlled by using a larger internal top category list 806 for calculating the top categories, which is after the calculation is finished, truncated to a shorter list.

After step 1008 updated the category list entry identified in step 1006 by changing its classification coordinates and incrementing its category quantity measure, a resort of the internal top category list 806 may be required which is on demand performed by step 1010 to reestablish the sort criteria "highest to lowest category quantity measure". The process then ends with step 1011. It is noteworthy that the sort criteria "parents before child" may be temporary violated during the processing of category update entries 312 of a sorted category update list, e.g. if a category update entry introduces new classification coordinates for which not all parent coordinates are yet in the top category list. However, as the sorted category update list contains also all corresponding more generic coordinates, missing parent coordinates are added during the processing of the category update list and after the full category update list is processed, also the "parent before child" sort is met again. The process described in FIG. 10 provides a conceptual adaptation of the space saving algorithm described by A. Metwally et al. to provide a computational and space efficient estimation of the top-k elements in a data stream. It may become apparent to those skilled in the art that various implementations of the space saving algorithm, based on different data types, like a heap data structure or a stream summary data structure as proposed by A. Metwally may be used to implement a process as described in FIG. 10 without leaving the spirit and scope of the present invention.

The processing required to provide a historic top category list as performed by the top category extractor, either cyclically or on request, is shown in FIG. 11. The process starts with step 1101 when a new version of a top category list is required. Following step 1102 fetches the internal top category list 806 and subsequent step 1103 truncates the internal top category list 806 to the desired truncated size 808 by removing the top category entries exceeding the truncated size from the fetched top category list. Afterwards, step 1104 clears the internal top category list 806 of the top category estimator 805 to prepare it for a new top category estimation based on future received sorted category update lists. Following step 1105 provides the truncated top category list 810 and terminates the process.

A flow chart that describes the merging of multiple partial top category lists 204 into a global top category list 112 as performed by a historic top category merger 206 is depicted in FIG. 12. The process starts with step 1201, either when a cyclic global top category list update interval is elapsed or when all expected top partial top category lists are available in an updated state. Following step 1202 selects a first partial top category list and inserts it into an internal intermediate list maintained by the top category merger 206. Afterwards, step 1203 selects a next partial top category list 204 and inserts it sorted, according to the category quantity measure values, into the intermediate top category list. A stable sorting algorithm is used that preserves the relative position of category list entries with the same category quantity measure value during sorting. A stable sort is required to keep the "parents before child" sort criteria during the merge process. In case of a sort algorithm that is not stable, entries having the same category quantity measure values could change place, causing a child being listed before one of its parents which could lead to a fragmented category hierarchy. Following decision step 1204 checks if further partial top category lists are available for the merge operation. In case such lists are available, the process continues with step 1203. Otherwise, the process continues with step 1205 which truncates the intermediate list to a desired result list size and provide the truncated list as merged result list. The process then ends with step 1206.

Data records to store statistical descriptions of historic top categories and to store measures and statistical data that describe the current performance and behavior of transactions corresponding to a historic top category are shown in FIG. 13. A historic top category description record 1301 which may be used to store descriptive statistical data describing transaction executions corresponding to a detected historic top category that were performed in a historic observation period is shown in FIG. 13a. A historic top category description record 1301 may contain but is not limited to a set of classification coordinates 322, specifying the position of the corresponding top category in a multi-dimensional, hierarchic classification space, a time series list 1302 containing a list of time series describing various performance and behavior related measures extracted from transaction trace data, and a set of descriptive statistical parameters 1306 statistically describing the transaction executions corresponding to the top category that were executed during the historic observation period. The time series list section 1302 may contain but is not limited to a time series describing the response times of the corresponding observed transactions 1303, a time series describing the CPU usage caused by the observed transactions, or a time series describing the transaction load during the observation period, e.g. per interval (e.g. number of transaction executions per second, 10 second or 5 minutes) of the observation period. The descriptive statistical parameter section 1306 may contain but is not limited to a set of response time quantiles 1306, or error rates of the transactions executed during the observation period.

A current top category measure record 1310 as described in FIG. 13b contains measure data describing the performance and behavior of transactions corresponding to a specific historic top category that were executed in a current observation period. A current top category measure record 1310 may contain but is not limited to a historic top category description record reference 1311 linking a current top category measure record with its corresponding historic top category description record 1301, a time slot field 1312, specifying the current time period described by the current top category measure record 1310, a measure time slot aggregations section 1313, containing aggregated measurement data describing corresponding transaction executions in the observed timeslot, and a category time slot quantity measures section 1316 containing quantitative descriptions of the current transaction executions corresponding to the top category that were executed during the observation time slot. A measure time slot aggregations section 1313 may contain but is not limited to minimum, maximum and average values of an estimation of corresponding quantiles of response times 1314 and CPU usage 1315 of transaction traces corresponding to the top category and the time slot 1312. A category time slot quantity measure section 1316 may contain but is not limited to an entry describing the number of transaction 1317, an entry describing the number of failed transactions 1318 and one or more entries describing the number of transactions with a response time higher than a specific quantile of the quantiles describing the corresponding historic reference period 1307. A concrete entry describing the number of transactions matching the top category with a response time higher than a specific quantile of the quantiles describing the corresponding historic reference period may e.g. report the number of current transactions with a response time that is higher than the 0.5 quantile of transaction response times of the transactions matching the same top category executed during the historic reference period category. Current top category measure records 1310 and corresponding historic top category description records may be used to identify deviations and anomalies between historic and current transaction executions of a specific top category.

The determination of the corresponding top categories for the classification parameters of an incoming current transaction trace is visually described in FIG. 14. Exemplary simplified classification parameters 1437 (a subset of classification parameters 303 of a transaction trace with specific, exemplary values) of an incoming transaction trace 107 specify that the transaction was executed by a web-browser running on a computer system situated in Vienna, Austria and was performed using a mobile Firefox® web-browser with version number 4.

FIG. 14a describes a simplified, two-dimensional hierarchic category space containing the dimensions "geolocation" and "web-browser". The classification coordinates ("All", "All") 1402, ("Europe", "All,) 1404, ("Asia", "All") 1414, ("All", "Mobile Browser") 1417, ("All", "Desktop") 1429, ("All", "Desktop Firefox") 1432, ("All", "Desktop Internet Explorer") 1433, ("Europe", "Mobile Browser") 1422, ("Germany", "All") 1406, ("Austria", "All") 1408 and ("All", "Mobile Firefox") 1419 correspond to detected historic top categories. Classification coordinates ("Austria", "Mobile Firefox") 1424, ("Linz", "All") 1411, ("Vienna", "All") 1424, ("All", "Mobile Firefox 4") 1428 and ("Vienna", "Mobile Firefox 4") are identifying other categories that are not part of the of the previously determined top category set.

On determining the matching top categories for the classification parameters of an incoming transaction trace, the best matching, most specific classification coordinates for the classification parameters are identified. In the current example, the classification parameter values of the incoming transaction trace are "Vienna" for the geolocation dimension and "Mobile Firefox 4" for the web-browser dimension. The corresponding classification coordinate is ("Vienna", "Mobile Firefox 4") 1426. This coordinates specify a first corner point of the coordinate space that is relevant for the incoming transaction. Afterwards, coordinates are selected which have one coordinate set to the corresponding transaction coordinate value and all other set to the most generic value. Those coordinates represent additional corner points of the coordinate space that is relevant for the incoming transaction. In the current, simplified, two-dimensional example, those are the coordinates ("Vienna", "All") 1412 and ("All", "Mobile Firefox 4") 1428. The final corner point defining the relevant coordinate space for the incoming transaction is the most generic coordinate ("All", "All"). The path from those coordinates to the most generic coordinate ("All", "All") 1402 specify the borders of the coordinate space that is relevant for the classification parameters 1437 of the incoming transaction trace. The identified 1438 relevant coordinate space may also be denoted as "relevant slice". The relevant slice for the coordinate space and the incoming transaction of the current example is depicted in FIG. 14*b*. The before determined corner points 1426, 1412, 1428 and 1402 define the relevant slice for the incoming transaction. All coordinates contained in the relevant slice, represent transaction categories matching the classification parameters of the incoming transaction. To identify the top categories relevant for the incoming transaction it is now sufficient to select all classification coordinates of the relevant slice that correspond to a previously detected historic top category. In the current example those classification coordinates consist in coordinates 1402, 1404, 1408, 1417, 1419 and 1422.

A generic description of the process to identify relevant top categories for an incoming transaction trace, as e.g. performed by a matching top category detector 1601 is shown in FIG. 15. The process starts with step 1501 when a new transaction trace is received and corresponding top categories for the transaction are required. Following step 1502 identifies the relevant slice for the classification parameters 303 of the incoming transaction. The relevant slice for the transaction classification parameters contains all coordinate points of the multidimensional hierarchical classification space that match the transaction classification parameters. The relevant slice may be determined similar to the processing to detect all more generic classification parameters for extracted classification parameters as described in step 906 of the process shown in FIG. 9. To identify the relevant slice, each coordinate dimension may first be analyzed separately. The most specific classification characteristic may be determined that matches the the value of the transaction classification parameter corresponding to an analyzed dimension. A path from the determined most specific classification characteristic to the most generic classification characteristic of the dimension may be determined. The determined path contains all classification characteristics of analyzed dimension that match the transaction classification parameter corresponding to the analyzed dimension. For the example depicted in FIG. 14*b* and for the geolocation dimension, this path would start with the most specific characteristic "Vienna" (extracted from the incoming transaction) over "AT" and "EU" and end with the most generic characteristic "All". For the browser dimension, the path would go from "Mob. FF 4" over "Mob. FF" and "Mob" to "All". After those paths are determined for each individual dimension, the relevant slice may be created by forming all possible coordinate combinations for all entries in this path. For the above example, the resulting set of coordinates contains the coordinates 1402, 1404, 1408 etc. as shown in FIG. 14*b*. Subsequent step 1503 removes coordinates from the relevant coordinate slice containing coordinate values never seen in a top category. In the above example, none of the top categories contained a geolocation coordinate value "Vienna", and none contained a web-browser coordinate value "Mobile Firefox 4". Consequently, all coordinates containing such coordinate values could be eliminated from the relevant slice before starting a search for contained top category coordinates. The filter functionality performed by step 1503 could e.g. be performed using a bloom filter for each dimension that is initialized with the top category coordinate values for that dimension. These bloom filters allow to efficiently exclude specific coordinate value of a specific dimension that cannot specify a top category. A bloom filter is initialized with a set of elements (e.g. category coordinate values of a specific coordinate dimension for all top categories). After the bloom filter is initialized, it can be used to determine in an efficient way if a new element (e.g. a candidate category coordinate value of the specific coordinate dimension) is not among the initialization elements. Bloom filters are space efficient and optimized for the task to determine if an element was not seen by the filter before. If the bloom filter result does not indicate that the new element was not seen before, this is no guarantee that the new element was really seen before. Returning to the example shown in FIG. 14*b*, the bloom filter for the geolocation dimension would be initialized with the values "All", "EU" and "AT" as those are the geolocation characteristics of top categories. The so initialized bloom filter would allow to remove all coordinate values of the relevant slice containing a geolocation characteristic "Vienna", as this geolocation characteristic is not contained in any top category coordinate. Another bloom filter may be initialized for the browser dimension with the values "All", "Mob." and "Mob. FF" and would in this example remove all coordinates specifying the browser down to its version, like "Mob. FF 4."

For brevity and better understandability, most examples to illustrate methodologies and algorithms presented herein, like the method to determine the relevant classification coordinate slice for an incoming transaction, are executed using only a two dimensional coordinate space. The described methodologies and algorithms to perform the tasks described in the examples may however be applied in scenarios with a coordinate space with more than two coordinate dimensions without conceptual changes.

Following step 1504 identifies for each remaining coordinate point in the relevant slice if it correspond to a detected historic top category. The coordination points that correspond to an identified top category are provided as a result by step 1504. The process then ends with step 1505.

A block diagram of a historic top category description extractor 114, which creates descriptive statistical data for historic top categories detected in a previous stage, is shown in FIG. 16.

A historic top category description extractor 114 consists in a classification hierarchy database 801 and a top category list 112, which are accessed by a matching top category detector 1601 to identify and provide classification coordinates 312 of top categories corresponding to an incoming transaction trace 108 that was executed during a historic observation period. In addition, it contains a measure extractor 1602, which analyzes received transaction traces to extract transaction measures 1604 describing specific aspects of incoming transactions, like their response time, CPU or memory usage, synchronization caused execution delays, or failures and exceptions occurred during transaction execution. In addition, the extracted measures may contain measure data describing a financial or other organizational relevancy of the transaction.

Both determined classification coordinates 1607 and transaction measures 1604 are forwarded to a historic top category record updater/creator 1603 which communicates 1609 with a historic top category description repository 119 to incrementally build historic top category description records 1301 representing the top categories of a specific historic observation period.

The historic top category record updater/creator checks for each received classification coordinate 312, if a corresponding historic top category description record 1301 exists in the historic top category description repository 119. If none exists, a new one is created and inserted into the repository 119.

The time series in the time series list 1302 and the descriptive statistical parameters 1306 of the corresponding top category description records 1301 are updated with the new measurement data of the corresponding transaction measures 1604.

A historic top category description extractor 114 processes each transaction that was recorded during the historic observation period and generates, for each previously identified top category, data describing the execution of transactions matching the top category that were executed during the historic observation period.

FIG. 17 provides a block diagram of a current top category measure extractor 104 which receives and processes current transaction traces, determines corresponding top categories and creates or updated data describing performance and functionality of transactions corresponding to historic top categories but which were executed during a current observation period. A current top category measure extractor 104 contains a matching top category detector 1601 which works similar to the matching top category detector 1601 of a historic top category description extractor 114 and identifies the top categories corresponding to an incoming transaction trace 108. However, different to the operating in a historic top category description extractor 114, it fetches data describing historic top categories from a historic top category repository 119 (as may be created by a historic top category description extractor 114), and creates historic top category references 1311 referring to historic top category records 1301 in the historic top category description repository 119 corresponding to the incoming transaction. A measure extractor 1602 processes and analyzes the incoming transaction trace 108 to create transaction measures 1604 corresponding to measure time slot aggregations 1313 and category time slot quantity measures 1316 of current top category measure records 1310. The created historic top category references 1311 and transaction measures 1604 are forwarded to a current top category record updater/creator 1701 which communicates 1706 with a current top category measures repository 118 to incrementally create current top category measure records 1310 describing the behavior of transaction traces corresponding to a historic top category that were executed during a time slot of a current observation period. The current top category record updater 1701 may in a first step determine the current time slot. As an example, a time slot may have a duration of one minute and a new time slot may be started with each full minute. Consequently, in this example, the current minute identifies the current time slot. In a subsequent step, the current top category record updater 1701 may check for each received historic top category reference 1311 if a corresponding current top category top measure record 1310 for the current time slot exists in the current top category measures repository 118. For top category references for which no such current top category measure record 1310 exists, new current top category measure records 1310 are created and inserted into the current top category measures repository 118 after their historic top category description record references 1311 and time slot 1312 were set. The received transaction measures 1604 are used to update corresponding measure time slot aggregations 1313 and category time slot quantity measures 1316 of the fetched or created current top category measure records 1310.

A current top category measure extractor 104 analyzes transaction traces 108 executed in a specific time slot of a current observation time period to create current top category measure records 1310 describing transactions matching specific detected historic top categories that were executed during a current observation time slot.

Referring now to FIG. 18, which provides a flow chart of a process that cyclically updates the historic top category description records 1301 stored in a historic top category description repository 119 to represent a new historic observation period, as e.g. performed by a historic top category description extractor 114. The process starts with step 1801, e.g. when a specific time period is elapsed and the current historic observation period is no longer valid. Subsequent step 1802 fetches the current top category list 112 from the historic top category extractor. This may either trigger creation of a new top category list by the historic top category extractor considering the new historic observation period which is then provided to the historic top category description extractor 114, or the historic top category description extractor 114 may retrieve an already existing top category list. This allows to e.g. either create top category lists for a wider historic observation period, like e.g. the whole last week and then for each day in the current week update historic top category description data considering only transactions from the same day of the last week, or create top category lists and historic top category description lists synchronously, by using transaction traces from the same historic time period like e.g. the last week for both calculation of a top category list 112 and calculation of a corresponding set of historic top category descriptions. Following step 1803 creates a historic top category description record 1301 for each category list entry 321 contained in the top category list 112 and sets the classification coordinates 322 of the created top category description record to the classification coordinates 322 of the category list entry 321.

Afterwards, step 1804 identifies for each transaction trace 108 in the new historic observation period those historic top category records 1301 that match the classification parameters 303 of the transaction trace. The classification hierarchy database 801 may e.g. be used to first find the most specific matching top category, and afterwards the most specific matching top category may be used to identify all more generic top categories that also match the classification parameters of the transaction trace.

Following step 1805 processes each transaction trace 108 in the new historic observation period to calculated measure data required for the time series list 1302 and descriptive statistical parameters 1306 section of historic top category description records 1301, and updates the matching historic top category description records 1301 identified for the transaction trace 108 in previous step 1804 with the extracted measure data.

After execution of step 1805, historic top category description records 1301 describing transaction executions in the new historic observation period are available for each top category. Following step 1806 stores the historic top category description records 1801 in a historic top category description record repository 119 and the process ends with step 1807.

A flowchart that describes a sliding window based update mechanism of current top category measure records 1310 that uses discrete time slots is shown in FIG. 19. The process starts with step 1901, after a time slot period (e.g. 1 minute) is elapsed and an update of the sliding window is required. The process is executed for each transaction trace that was received after the last cyclic sliding window update. Step 1902 analyzes and processes transaction trace data of a transaction corresponding to the current sliding window time slot to extract measurement data like response time, CPU usage, transaction failure indicator etc. The extracted measurement data may be used to update data stored in measure time slot aggregations 1311 section and category time slot quantity measure section 1316 of a current top category measure record 1310.

Following step 1903 first identifies the top categories corresponding to the classification parameters 303 of the processed transaction trace. This may be performed similar to step 1804 in process "Cyclic Top Category Description Update" depicted in FIG. 18. Then, it checks for each identified top category, if a corresponding current top category measure record 1310 with a time slot 1312 identifying the current time slot is available.

For identified top categories for which no current top category measure record 1310 for the current time slot is available, a new one is created, its time slot 1312 is set to indicate the current time slot and its historic top category description record reference 1311 is set to refer the historic top category description record corresponding to the top category for which a current top category measure record 1310 for the current time slot was missing.

Afterwards, step 1904 updates the measure time slot aggregations 1313 of each current top category measure record 1310 identified or created in step 1903 using the measurement data extracted from the transaction trace 108 in step 1902.

Subsequent step 1905 uses the extracted measurement data to update the category time slot quantity measure section 1316 of each current top category measure record 1310 identified or created in step 1903. Some of those measures, like number of transactions 1317 or number of failed transactions 1318 may be updated without the need of historic reference data. Others, like the measure number of response time quantile violations 1319, which measures the number of transactions with a higher response time than a specific quantile of the corresponding historic transactions, require historic reference data. For such measures that require a comparison with historic reference data, it is desired to use reference data from the most specific historic top category description record 1301 matching the transaction trace 108 to achieve best available accuracy of the comparison. The result of this comparison may then be used to update corresponding measures of all other matching current top category measure records 1310.

As an example, a transaction trace corresponding to the geolocation "Styria" may be processes. In this example, the network infrastructure of the region "Styria" may be slow, increasing the response time of all transactions initiated in this region. A comparison of a response time with a quantile value considering only transactions from this region may show no increased response time. A comparison with quantile values from the next more generic regions like "Austria" or "Europe", which consider also transactions from other regions having no slow network infrastructure, and thus averaging the network infrastructure bias of "Styria" away, would indicate a slow transaction. But this only documents the well-known fact that the network infrastructure of a specific region is slow and could further lead to false and misleading alerts. To avoid such undesired behavior, alerting systems may determine once, with the most similar available reference data if change relative to the baseline data occurred and then update corresponding, more generic top category measure records using the result of the comparison based on the baseline reference data of the most specific matching historic top category description record.

After execution of step 1905, the process ends with step 1906.

A flow chart that conceptually describes a process that cyclically performs a check for anomalies for all available top categories is shown in FIG. 20. Those anomalies may include unexpected deviations between performance or behavior of current transactions and historic reference transactions of the same top category. The process is executed for each top category described by a historic top category description record 1301 in the historic top category description repository. The process starts with step 2001, e.g. after a specific time (5 min, 10 min etc.) since the last cyclic anomaly check is elapsed. Following step 2002 fetches the current top category measure records 1310 matching the currently processed top category and having a time slot value that falls into the current sliding window used for the statistical tests. As an example, for a sliding window size of 5 minutes and time slots covering 1 minute intervals, step 2002 would select current top category measure records 1310 of the last five time slots. Following step 2003 fetches the historic top category description record 1301 matching the currently processed top category, e.g. by fetching the historic top category record 1301 referred by the history top category description record reference 1311 of the currently processed current top category measure record 1310. The fetched top category description record contains historic reference data required by some of the later performed tests. Subsequent step 2004 performs measure type specific statistical tests that compare measure data extracted from previously selected current top category measure records 1310 with the corresponding reference data from the historic top category description record 1301 fetched in step 2003. Statistically relevant deviations between current and historic data may be notified to an alerting module by step 2004. The process then ends with step 2005.

An exemplary visualization of measure data extracted from transaction trace data considering multiple influence factors on the transaction executions is shown in FIG. 21. The exemplary visualization shows the response time of all transactions performed in a specific time frame grouped by detected top categories. The view shows an overall average value 2108 of the response time measurements of all top categories in the center. An inner circle 2114 represents the minimum response time, an outer circle 2115 represents the maximum response time of all transactions and an intermediate circle 2109 represents the average response time in relation to the minimum and maximum response time. In some embodiments, the intermediate circle may show the median or another quantile of all response times instead of the average. Those circles are subdivided into sectors representing different dimension of the transaction classification space. In this example, there is a section representing the operating system 2101, bandwidth 2102, web-browser 2103, user action 2104 and geolocation 2105 dimension. The bars 2106 and 2107 in each sector represent those top categories having all classification dimension expect the one represented by the sector, set to the most generic value and which have the lowest and the highest average response time. In the exemplary visualization, the three top categories with highest 2106 and lowest 2107 measure value are displayed. This visualization e.g. shows that transactions from geolocations Northern America, Asia and Europe 2112 show the highest response times and Argentina, Madrid and Vienna 2113 show the lowest response times, not considering other influence factors like web-browser operating system types. In case a specific bar is selected 2110, the center of the circle also shows the average response time of transactions corresponding to the selected bar 2111.

The visualization allows a user, e.g. by clicking on a specific bar, to fix the value for a specific dimension and visualize the corresponding min/max values of the other dimension filtered by the value of the fixed dimension. A visualization of top categories after such a dimension drill-down is shown in FIG. 22. FIG. 22 shows a visualization of response times according to top categories with the geolocation dimension pinned to "China" 2201. All measure values, like overall 2108 or selection 2111 are calculated by only considering transactions originated in geolocation "China" and also all bars of all sectors are calculated by only considering transactions originated in China. A dashed circle 2202 represents the average measure value of all transactions of the pinned dimensions (e.g. all transactions originated in China, regardless of other influence factors like web-browser or bandwidth). This pinned down visualization reveals that transactions originated in China only use one specific type of user action, as the user action section 2104 now only shows one bar.

Coming now to FIG. 23 which conceptually describes data structures and processes that may be used to analyze a given top category set for unexpected deviations between category measurement values of parent and child categories. FIG. 23a describes an edge record 2301 which may be used to store the deviation of a measure between a parent and a child category of a given top-category set. Such an edge record 2301 may contain but is not limited to a parent category field 2302 identifying a parent category, a child category field identifying a direct child category of the parent category and a measurement factor field 2304 containing a factor describing the relative difference between the category measurement value of the parent category and the child category. The measurement factor may be calculated by dividing the category measurement value of the child category by the category measurement value of the parent category.

Advancing now to FIG. 23b which conceptually describes the process of calculating measurement factors between parent and child categories and identifying the parent category of a given child category out of the direct parent categories of the given child category that has the category measurement value that diverges most from the category measurement value of the child category. The process starts with step 2310 when a new top category set is available and is executed for each top category contained in the top category set. Step 2311 fetches the direct parent categories of the currently processed category. Referring to FIG. 23c for an example explaining the set of direct parent categories of a current category in a simplified, two dimensional classification space The classification space is restricted to the two classification dimensions "Browser" 2340 and "Geolocation" 2341. Category ("EU", "Mob") 2324 may be considered as currently processed category. The parent category of 2324 in the browser dimension would be ("EU", "All") 2321 and the parent category of category 2324 in the geolocation dimension would be ("All", "Mob") 2323. Following step 2312 calculates the measurement factor between the currently processed top category and its parent categories identified in previous step 2311 by dividing the category measurement value of the current category by the category measurement value of the parent categories. Referring again to FIG. 23c for an explaining example, step 2312 would for the current category 2324 with a measurement value of 11 ms and identified parent category 2321 with measurement value 20 ms calculate a factor of 0.55 2333, and for the identified parent category 2334 with measurement value 12 ms a factor of 0.92 2335.

Subsequent step 2313 selects the parent category out of the parent categories identified in step 2311 that has a measurement factor indicating the highest deviation to the measurement value of the current category. A measurement factor of 1 indicates no parent/child measurement deviation and the more the factor differs from the value 1, the higher is the deviation between parent and child measurement.

For the example based on category 2324 from FIG. 23c, the measurement factors between 2324 and parent category 2321 is 0.55 and between parent category 2323 it is 0.92. As the measurement factor between child category 2324 and parent category 2323 is the one that differs most from the neutral factor 1, parent category 2323 would be selected by step 2313.

Following step 2314 creates an edge record 2301 and sets its parent category 2302 to the parent category identified in step 2313, its child category 2303 to the current category and the measurement factor 2304 to the measurement factor calculated for the current category and the selected parent category. Afterwards, the process ends for the current category with step 2315. After the process described in FIG. 23b was executed for all categories in the received top category list, a set of edge records 2301 describing the measurement relationships between categories and their direct parent category with the highest deviating measurement is available. This set of edge records 2301 may also be referred to as anomaly candidate edge set, as it describes those parent/child category edges that show the highest measurement deviation.

Coming now to FIG. 23c which shows an exemplary, simplified, two dimensional top category set, which is used to illustrate the calculation of category measurement values and the selection of the parent category of a given category that has the most deviating measurement value. The exemplary top category set consists in top categories 2320 to 2327 with measurement values ranging from 10 ms to 20 ms. The measurement values may e.g. describe the median response time of transactions corresponding to the categories. For each parent/child category pair, the measurement factor 2330 to 2337 may be calculated as the child category measurement value dived by the parent category measurement value. As an example, the measurement factor 2330 between category 2321 with measurement value 20 ms and category 2320 with measurement value 10 ms has the value 2.

Advancing now to FIG. 23d, which describes the rating of anomaly candidate edges identified by the process described in FIG. 23b. The process starts with step 2351 when a new set of anomaly candidate edges is available. Following step 2352 sorts the anomaly edges according to their measurement factor from measurement factor indicating the highest deviation to the measurement factor indicating the lowest deviation. The process then ends with step 2353, and the ranked anomaly candidate edge set may be provided to a visualization module. Factors describing a child measurement value that is higher than the parent measurement value have a value range from 1 to infinity, whereas factors describing a child measure value that is lower than the parent have a value range from 0 to 1. As a consequence, factors greater than 1 and smaller than 1 cannot be directly compared to determine the factor indicating a higher measurement value deviation. To compare a factors with a value less than 1 with one having a value larger than one, the reciprocal value of the factor that is less than one may be calculated. If this reciprocal value is larger than the other factor with a value greater than one, then the factor smaller than one indicates a higher measurement deviation. Otherwise the factor larger than one describes a higher measurement value deviation. The processing described in FIGS. 23b and 23d may be performed by a current top category measure extractor 104, e.g. when a cyclic sliding window update period is elapsed.

Referring now to FIG. 24 which provides an exemplary visualization of a top category set together with a visualization of the most prominent anomalies within the top category set in form of a screenshot. The right part of FIG. 24 shows a visualization of identified top categories 2401, as already shown and described in FIG. 21. The left part of FIG. 24 shows a top findings section 2402 which in this example shows a visualization of the three most severe identified anomalies 2403, 2407 and 2410. Each visualization consists in a dimension icon 2404, 2406 and 2409 identifying the classification dimension in which the anomaly was detected. For the anomalies 2403 and 2407, the dimension icon identifies the operating system dimension, as they describe anomalies identified within the operating system dimension. For anomaly 2409 which describes an anomaly detected in the geolocation dimension, the dimension icon 2409 indicates the geolocation dimension. Each anomaly visualization also contains a description text 2405 to 2411 which specifies parent and child category involved in the anomaly and the extent of the identified anomaly. For anomaly visualization 2403, the description text 2405 identifies the category with coordinates "Windows" for the operating system dimension, Internet Explorer for the browser dimension, and "All" for other dimensions as parent category, and the category with operating system coordinate "Windows Vista" and all other dimension coordinates identical to the parent category as child category. The description text also specifies the extent of the anomaly as 1.05 k, indicating that the category measurement value (e.g. median response time) on "Windows Vista" operating systems is more than 1000 times higher than on "Windows" operating systems in general. The exemplary visualization only shows the three most severe anomalies but other embodiments may display another number of identified anomalies.

Coming now to FIG. 25 which depicts the visualization of subset of a top category set that corresponds to a selected identified anomaly of the top category set. The left part of FIG. 25 shows a top finding section, in which a top finding (top finding 2403 of FIG. 24) is selected 2501. On selection of the top finding, the top category visualization on the right side 2502 is updated to visualize the portion of the top category set that corresponds to the selected anomaly. The selected anomaly identifies an unexpected measurement value difference in the operating system dimension, therefore the visualization of the operating system dimension shows one bar 2503 for the parent category (i.e. "Windows") and one bar for the child category (i.e. "Windows Vista") to visualize the extent of the detected difference. In addition, the exact factor of the numerical difference 2502 is also annotated to the operating system dimension. The selected anomaly was only monitored for browsers of the type "Internet Explorer", therefore the browser dimension only contains one value 2505 representing the "Internet Explorer" classification dimension value. The other dimensions describe the variations of top category measurements of categories having browse dimension and operating system dimension fixed to "Internet Explorer" and "Windows Vista" and may be used to identify other factors like a geographic location or a type of user action that have an influence on the identified anomaly. The selection of edge records 2301 and the presentation of those selected edge records as top findings to a user of the monitoring system as described in FIGS. 24 and 25 may be performed by a top category visualization unit 116.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for detecting anomalies in a performance metric associated with computer transactions of a distributed computing environment, comprising:
   receiving, by a historic category extractor, a plurality of previous transaction events resulting from computer transactions executed in the distributed computing environment, where each transaction event includes one or more classification parameters for the associated computer transaction and the computer transactions are data exchanges between at least two computing devices in the distributed computing environment;
   identifying, by the historic category extractor, a listing of top n categories from the plurality of previous transaction events, where the top n categories correlate to classification parameters from a subset of previous transaction events which meet a selection criteria and the top n categories are arranged hierarchically such that a particular category is a root category or has one or more parent categories, where a parent category is more generic than the particular category;
   for each transaction event in the plurality of previous transaction events, determining, by a historic category description extractor, categories in the listing of top n categories that match the classification parameters in a given previous transaction event, extracting a measurement value for a given performance metric from the given previous transaction event and updating a historic distribution parameter for the given performance metric associated with matched categories using the extracted measurement value for the given performance metric;
   receiving, by a current category measure extractor, a plurality of current transactions events resulting from transactions executed in the distributed computing environment, where the plurality of current transaction event occurred more recently than the plurality of previous transaction events;
   for each transaction event in the plurality of current transaction events, determining, by the current category measure extractor, categories in the listing of top n categories that match the classification parameters in a given current transaction event, extracting a measurement value for the given performance metric from the given current transaction event and updating a current time slot distribution parameter for the given performance metric associated with matched categories using the extracted measurement value for the given performance metric, fetching a plurality of time slot distribution parameters for the given performance metric for a set of consecutive, prior time slots, where the set of consecutive, prior time slots form a sliding window that advances over time such that a time slot most distal from a current time slot is replaced in the set of consecutive, prior time slots by the current time slot, and merging the plurality of fetched current time slot distribution parameters for the given performance metric into a current distribution parameter;
   and
   comparing, by a statistical anomaly detector, the current distribution parameter to the historic distribution parameter to detect anomalies in the given performance metric.

2. The method of claim 1 wherein the selection criteria is defined as one of classification parameters occurring most frequently in the plurality of previous transaction events or classification parameters from transaction events having largest financial impact, classification parameters from transaction events having the largest resource consumption, or classification parameters from transaction events having the largest response time.

3. The method of claim 1 wherein identifying a listing of top n categories further comprises
   extracting a classification parameter from a given previous transaction event;
   determining a most specific category corresponding to the extracted classification parameter by accessing a predetermined classification hierarchy stored in a database;
   creating an entry for the most specific category in a category update list;
   identifying generic categories having an ancestral relationship with the most specific category by accessing the predetermined classification hierarchy; and
   adding entries for each identified generic category to the category update list while maintaining a specific to generic ordering of entries in the category update list.

4. The method of claim 3 wherein identifying a listing of top n categories further comprises
   comparing an update entry from the category update list with entries in the listing of top n categories;
   incrementing a counter of a given entry in the listing of top n categories when the update entry from the category update list matches the given entry, where the counter indicates value of the selection criteria of the category corresponding to the given entry;
   creating an entry in the listing of top n categories for the update entry when the update entry does not match an entry in the listing of top n categories and quantity of entries in the listing of top n categories is less than n;
   and
   replacing an entry in the listing of top n categories with the update entry when the update entry does not match an entry in the listing of top n categories and the quantity of entries in the listing of top n categories is equal to n.

5. The method of claim 4 wherein replacing an entry in the listing of top n categories with the update entry further comprises
identifying an entry in the listing of top n categories whose counter has lowest value; and
replacing the identified entry with the update entry, where the counter of the update entry has a value set to the counter of the identified entry summed with the counter of the update entry.

6. The method of claim 1 wherein the classification parameters are selected from a group consisting of geographic location, type of web browser, type of operating system, type of user action and type of network connection.

7. The method of claim 1 wherein the performance metric is further defined as one of response time, CPU usage, transaction load time, transaction failure rate, or a parameter extracted from the transaction event that describes a financial impact of the transaction execution described by the transaction event.

8. The method of claim 1 wherein the current distribution parameter is further defined as one of a minimum, a maximum, a median, an average, or a quantile.

9. The method of claim 1 further comprises presenting values for the given performance metric across a plurality of classification parameters, where the values for the given performance metric are formatted in a circular bar chart segmented into a plurality of segments, each segment corresponding to a classification parameter.

10. The method of claim 9 wherein each bar in the circular bar chart corresponds to a given classification parameter having a specific value with the other classification parameters set to a generic value with respect to the specific value.

11. The method of claim 10 further comprises receiving a selection of one bar in the circular bar chart and, in response to the selection, presenting values for the given performance metric across the plurality of classification parameters, where the values for the given performance metric only account for transactions having the selected classification parameter.

12. The method of claim 9 further comprises partitioning the circular bar chart with an inner circle, an intermediate circle and an outer circle, where the inner circle signifies a minimum value for the given performance metric, the intermediate circle signifies an average value for the given performance metric and the outer circle signifies a maximum value for the given performance metric.

13. The method of claim 1 further comprises:
calculating, for each category in the listing of top n categories, relative difference between a performance metric in a given category in the listing of top n categories and a performance metric in each parent category to the given category;
identifying, for each category in the listing of top n categories, the parent category having the largest relative difference;
creating, for each identified parent category, an edge record, where the edge record includes an identifier for the identified parent category, an identifier for corresponding given category and corresponding relative difference;
sorting the edge records according to relative differences contained therein;
selecting a subset of the edge records; and
presenting the subset of edge records on a display device.

14. The method of claim 1 further comprises grouping two or more computer transactions as a visit and detecting anomalies in a performance metric associated with the visit in accordance with the steps of claim 1, where the two or more computer transactions correspond to one interaction by a given user with an application.

15. The method of claim 1 further comprises detecting, by one or more agents, execution of computer transactions in the distributed computing environment and generating the plurality of current transaction events from the detected computer transactions, where the one or more agents are instrumented in applications performing the computer transactions and the one or more agents are implemented by computer executable instructions executed by a computer processor.

16. The method of claim 1 further comprises identifying a listing of top n categories from the plurality of previous transaction events by estimating the top n categories with an estimation error, where the estimation error is inversely proportional to an amount of memory used for the estimation and the amount of memory is independent from the number categories and the number of previous transaction events.

17. A computer-implemented method for detecting anomalies in a performance metric associated with computer transactions of a distributed computing environment, comprising:
receiving, by a historic category extractor, a plurality of previous transaction events resulting from transactions executed in the distributed computing environment, where each transaction event includes one or more classification parameters for the associated transaction and the computer transactions are data exchanges between at least two computing devices in the distributed computing environment;
identifying, by the historic category extractor, a listing of top n categories from the plurality of previous transaction events, where the top n categories correlate to classification parameters occurring most frequently in the plurality of previous transaction events and the top n categories are arranged hierarchically such that a particular category is a root category or has one or more parent categories, where a parent category is more generic than the particular category;
for each transaction event in the plurality of previous transaction events, determining, by a historic category description extractor, categories in the listing of top n categories that match the classification parameters in a given previous transaction event, extracting a measurement value for a given performance metric from the given previous transaction event and updating a historic distribution parameter for the given performance metric associated with matched categories using the extracted measurement value for the given performance metric;
receiving, by a current category measure extractor, a plurality of current transactions events resulting from transactions executed in the distributed computing environment, where the plurality of current transaction event occurred more recently than the plurality of previous transaction events;
for each transaction event in the plurality of current transaction events, determining, by the current category measure extractor, categories in the listing of top n categories that match the classification parameters in a given current transaction event, extracting a measurement value for the given performance metric from the given current transaction event, updating a current time slot distribution parameter for the given performance metric associated with matched categories using the extracted measurement value for the given performance metric, fetching a plurality of time slot distribution parameters for the given performance metric for a set of consecutive, prior time slots, where the set of consecutive, prior time slots form a sliding window that advances over time such that a time slot most distal from a current time slot is replaced in the set of consecutive, prior time slots by the current time slot, and merging the plurality of fetched current time slot distribution parameters for the given performance metric into a current distribution parameter;
and
comparing, by a statistical anomaly detector, the current distribution parameter to the historic distribution parameter to detect anomalies in the given performance metric.

18. The method of claim 17 wherein identifying a listing of top n categories further comprises
extracting a classification parameter from a given previous transaction event;
determining a most specific category corresponding to the extracted classification parameter by accessing a predetermined classification hierarchy stored in a database;
creating an entry for the most specific category in a category update list;
identifying generic categories having an ancestral relationship with the most specific category by accessing the predetermined classification hierarchy; and
adding entries for each identified generic category to the category update list while maintaining a specific to generic ordering of entries in the category update list.

19. The method of claim 18 wherein identifying a listing of top n categories further comprises
comparing an update entry from the category update list with entries in the listing of top n categories;
incrementing a counter of a given entry in the listing of top n categories when the update entry from the category update list matches the given entry, where the counter indicates occurrences of transaction events in the category corresponding to the given entry;
creating an entry in the listing of top n categories for the update entry when the update entry does not match an entry in the listing of top n categories and quantity of entries in the listing of top n categories is less than or equal to n; and
replacing an entry in the listing of top n categories with the update entry when the update entry does not match an entry in the listing of top n categories and the quantity of entries in the listing of top n categories is more than n.

20. The method of claim 19 wherein replacing an entry in the listing of top n categories with the update entry further comprises
identifying an entry in the listing of top n categories whose counter has lowest value; and
replacing the identified entry with the update entry, where the counter of the update entry has a value set to the counter of the identified entry summed with the counter of the update entry.

21. The method of claim 19 further comprises extracting a second classification parameter from the given previous transaction event and repeating the steps for identifying a listing of top n categories for the second classification parameter.

22. The method of claim 17 wherein the classification parameters are selected from a group consisting of geographic location, type of web browser, type of operating system and type of network connection.

23. The method of claim 17 wherein the performance metric is further defined as one of response time, CPU usage or transaction load time.

24. The method of claim 13 wherein the current distribution parameter is further defined as one of a minimum, a maximum, a median, an average, or a quantile.

25. An anomaly detection system that monitors computer transactions in a distributed computing environment, comprising:
a processor;
a non-transitory computer readable medium having computer program instructions stored thereon, wherein the computer program instructions, when executed by the processor, perform processing of:
a historic category extractor configured to receive a plurality of previous transaction events resulting from computer transactions executed in the distributed computing environment and operates to identify a listing of top n categories from the plurality of previous transaction events, where each transaction event includes one or more classification parameters for the associated transaction and the computer transactions are data exchanges between at least two computing devices in the distributed computing environment, the top n categories correlate to classification parameters occurring most frequently in the plurality of previous transaction events and the top n categories are arranged hierarchically such that a particular category is a root category or has one or more parent categories, where a parent category is more generic than the particular category;
wherein for each transaction event in the plurality of previous transaction events, the historic category extractor determines, categories in the listing of top n categories that match the classification parameters in a given previous transaction event, extract a measurement value for a given performance metric from the given previous transaction event and update a historic distribution parameter for the given performance metric associated with matched categories using the extracted measurement value for the given performance metric;
a current category measure extractor configured to receive a plurality of current transactions events resulting from transactions executed in the distributed computing environment, where the plurality of current transaction events occurred more recently than the plurality of previous transaction events;
wherein for each transaction event in the plurality of current transaction events, the current category measure extractor determines categories in the listing of top n categories that match the classification parameters in a given current transaction event, extract a measurement value for the given performance metric from the given current transaction event, update a current time slot distribution parameter for the given performance metric associated with matched categories using the extracted measurement value for the given performance metric, fetch a plurality of time slot distribution parameters for the given performance metric for a set of consecutive, prior time slots, where the set of consecutive, prior time slots form a sliding window that advances over time such that a time slot most distal from a current time slot is replaced in the set of consecutive, prior time slots by the current time slot, and merge the plurality of fetched current time slot distribution parameters for the given performance metric into a current distribution parameter;

a statistical anomaly detector that operates to compare the current distribution parameter to the historic distribution parameter to thereby detect anomalies in the given performance metric.

26. The anomaly detection system of claim 25 wherein the historic category extractor identifies a listing of top n categories by extracting a classification parameter from a given previous transaction event;

determining a most specific category corresponding to the extracted classification parameter by accessing a predetermined classification hierarchy stored in a database;

creating an entry for the most specific category in a category update list;

identifying generic categories having an ancestral relationship with the most specific category by accessing the predetermined classification hierarchy; and adding entries for each identified generic category to the category update list while maintaining a specific to generic ordering of entries in the category update list.

27. The anomaly detection system of claim 26 wherein the historic category extractor further operates to compare an update entry from the category update list with entries in the listing of top n categories;

increment a counter of a given entry in the listing of top n categories when the update entry from the category update list matches the given entry, where the counter indicates occurrences of transaction events in the category corresponding to the given entry;

create an entry in the listing of top n categories for the update entry when the update entry does not match an entry in the listing of top n categories and quantity of entries in the listing of top n categories is less than or equal to n; and replace an entry in the listing of top n categories with the update entry when the update entry does not match an entry in the listing of top n categories and the quantity of entries in the listing of top n categories is more than n.

28. The anomaly detection system of claim 27 wherein the historic category extractor replaces an entry in the listing of top n categories with the update entry by identifying an entry in the listing of top n categories whose counter has lowest value; and replacing the identified entry with the update entry, where the counter of the update entry has a value set to the counter of the identified entry summed with the counter of the update entry.

29. The anomaly detection system of claim 25 wherein the classification parameters are selected from a group consisting of geographic location, type of web browser, type of operating system and type of network connection.

30. The anomaly detection system of claim 25 wherein the performance metric is further defined as one of response time, CPU usage or transaction load time.

31. The anomaly detection system of claim 25 wherein the current distribution parameter is further defines as one of a minimum, a maximum, a medium, an average, or a quantile.

32. The anomaly detection system of claim 25 further comprises a historic top category repository that stores the listing of top n categories;

a current top category measure repository that stores values for the given performance metric across a plurality of classification parameters; and a category visualization unit having access to the historic top category repository and the current top category measure repository and operates to present values for the given performance metric across the plurality of classification parameters on a display device, where the values for the given performance metric are formatted in a circular bar chart.

33. The anomaly detection system of claim 32 wherein the circular bar chart is partitioned by an inner circle, an intermediate circle and an outer circle, where the inner circle signifies a minimum value for the given performance metric, the intermediate circle signifies an average value for the given performance metric and the outer circle signifies a maximum value for the given performance metric.

34. The anomaly detection system of claim 25 further comprises a plurality of historic category extractors, each historic category extractor is configured to receive a portion of the plurality of previous transaction events resulting from transactions executed in the distributed computing environment and operates to identify a partial listing of top n categories from the plurality of previous transaction events; and a top category merger configured to receive the partial listing of top n categories from the plurality of historic category extractors and operates to merge the partial listing of top n categories into one listing of top n categories.

35. The anomaly detection system of claim 34 further comprises a plurality of current category measure extractors, each current category measure extractor configured to receive a portion of the plurality of current transactions events, wherein for each transaction event in the portion of the plurality of current transaction events, the current category measure extractor determines categories in the listing of top n categories that match the classification parameters in a given current transaction event, extract a measurement value for the given performance metric from the given current transaction event and update a current distribution parameter for the given performance metric associated with matched categories using the extracted measurement value for the given performance metric.

* * * * *